(12) United States Patent
Han et al.

(10) Patent No.: US 8,514,826 B2
(45) Date of Patent: Aug. 20, 2013

(54) METHOD AND APPARATUS FOR TRANSMITTING CONTROL INFORMATION IN RADIO COMMUNICATION SYSTEM

(75) Inventors: Seunghee Han, Anyang-si (KR); Jinmin Kim, Anyang-si (KR); Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 13/287,961

(22) Filed: Nov. 2, 2011

(65) Prior Publication Data

US 2012/0106478 A1    May 3, 2012

Related U.S. Application Data

(60) Provisional application No. 61/409,124, filed on Nov. 2, 2010.

(30) Foreign Application Priority Data

Oct. 10, 2011 (KR) .................. 10-2011-0103022

(51) Int. Cl.
*H04Q 7/24* (2006.01)

(52) U.S. Cl.
USPC ............ 370/338; 370/329; 370/252; 455/450

(58) Field of Classification Search
USPC ........................................ 455/450
See application file for complete search history.

(56) References Cited

U.S. PATENT DOCUMENTS

| | | | |
|---|---|---|---|
| 8,359,039 B2 * | 1/2013 | McBeath et al. | 455/450 |
| 2009/0185531 A1 | 7/2009 | Chun et al. | |
| 2010/0091708 A1 | 4/2010 | Nishikawa et al. | |
| 2010/0246465 A1 | 9/2010 | Cai et al. | |
| 2011/0243066 A1 * | 10/2011 | Nayeb Nazar et al. | 370/328 |
| 2012/0155337 A1 * | 6/2012 | Park | 370/280 |
| 2012/0170533 A1 * | 7/2012 | Ahn et al. | 370/329 |

FOREIGN PATENT DOCUMENTS

| | | |
|---|---|---|
| KR | 1020110082004 | 7/2011 |
| KR | 1020110090783 | 8/2011 |
| WO | 2010-018980 | 2/2010 |
| WO | 2010-074500 | 7/2010 |

OTHER PUBLICATIONS

Korean Intellectual Property Office Application Serial No. 10-2011-0103022, Notice of Allowance dated Oct. 18, 2012, 3 pages.

* cited by examiner

*Primary Examiner* — Duc C Ho
(74) *Attorney, Agent, or Firm* — Lee, Hong, Degerman, Kang & Waimey

(57) ABSTRACT

A method for transmitting control information using PUCCH format 3 in a radio communication system includes detecting one or more Physical Downlink Control Channels (PDCCHs), receiving one or more Physical Downlink Shared Channel (PDSCH) signals corresponding to the one or more PDCCHs, and determining a PUCCH resource value $n_{PUCCH}^{(3,\tilde{p})}$ corresponding to a value of a transmit power control (TPC) field of a PDCCH for a PDSCH signal on a secondary cell (SCell) among a plurality of PUCCH resource values configured by a higher layer for the PUCCH format 3. If a single antenna port transmission mode is configured, the PUCCH resource value $n_{PUCCH}^{(3,\tilde{p})}$ indicated by the TPC field is mapped to one PUCCH resource for a single antenna port, and, if a multi-antenna port transmission mode is configured, the PUCCH resource value $n_{PUCCH}^{(3,\tilde{p})}$ indicated by the TPC field is mapped to a plurality of PUCCH resources for multiple antenna ports.

6 Claims, 33 Drawing Sheets

FIG. 5
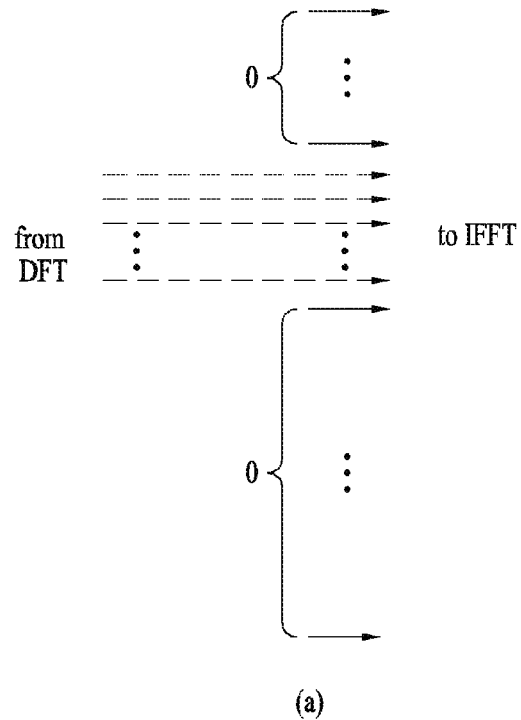
(a)
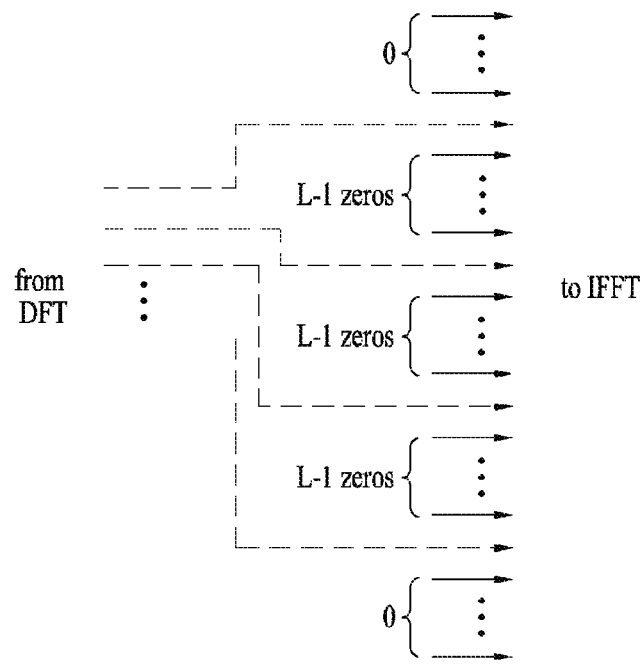
(b)

PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | | ACK/NACK orthogonal cover | | |
|---|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | | $n_{OC} = 0$ | $n_{OC} = 1$ | $n_{OC} = 2$ |
| $n_{CS} = 0$ | $n_{CS} = 1$ | $n' = 0$ | | | | $n' = 0$ | | |
| 1 | 2 | 0 | | | | 0 | | |
| 2 | 3 | 1 | 6 | 12 | | 1 | 6 | 12 |
| 3 | 4 | 2 | 7 | 13 | | 2 | 7 | 13 |
| 4 | 5 | | | | | | | |
| 5 | 6 | 3 | 8 | 14 | | 3 | 8 | 14 |
| 6 | 7 | | | | | | | |
| 7 | 8 | 4 | 9 | 15 | | 4 | 9 | 15 |
| 8 | 9 | | | | | | | |
| 9 | 10 | 5 | 10 | 16 | | 5 | 10 | 16 |
| 10 | 11 | | | | | | | |
| 11 | 0 | | 11 | 17 | | | 11 | 17 |

$\Delta_{shift}^{PUCCH} \in \{1,2,3\}$ for normal cyclic prefix
$\{1,2,3\}$ for extended cyclic prefix $\delta_{offset}^{PUCCH} \in \{0,1,...,\Delta_{shift}^{PUCCH} - 1\}$ Cell specific cyclic shift offset Cell-specific Cyclic shift value of CAZAC sequence $n_{OC}$ Orthogonal sequence index for ACK/NACK
$\bar{n}_{OC}$ Orthogonal sequence index for RS
$n_{CS}$ Cyclic shift value of a CAZAC sequence
$n'$ ACK/NACK resource index used for the channelization in a RB

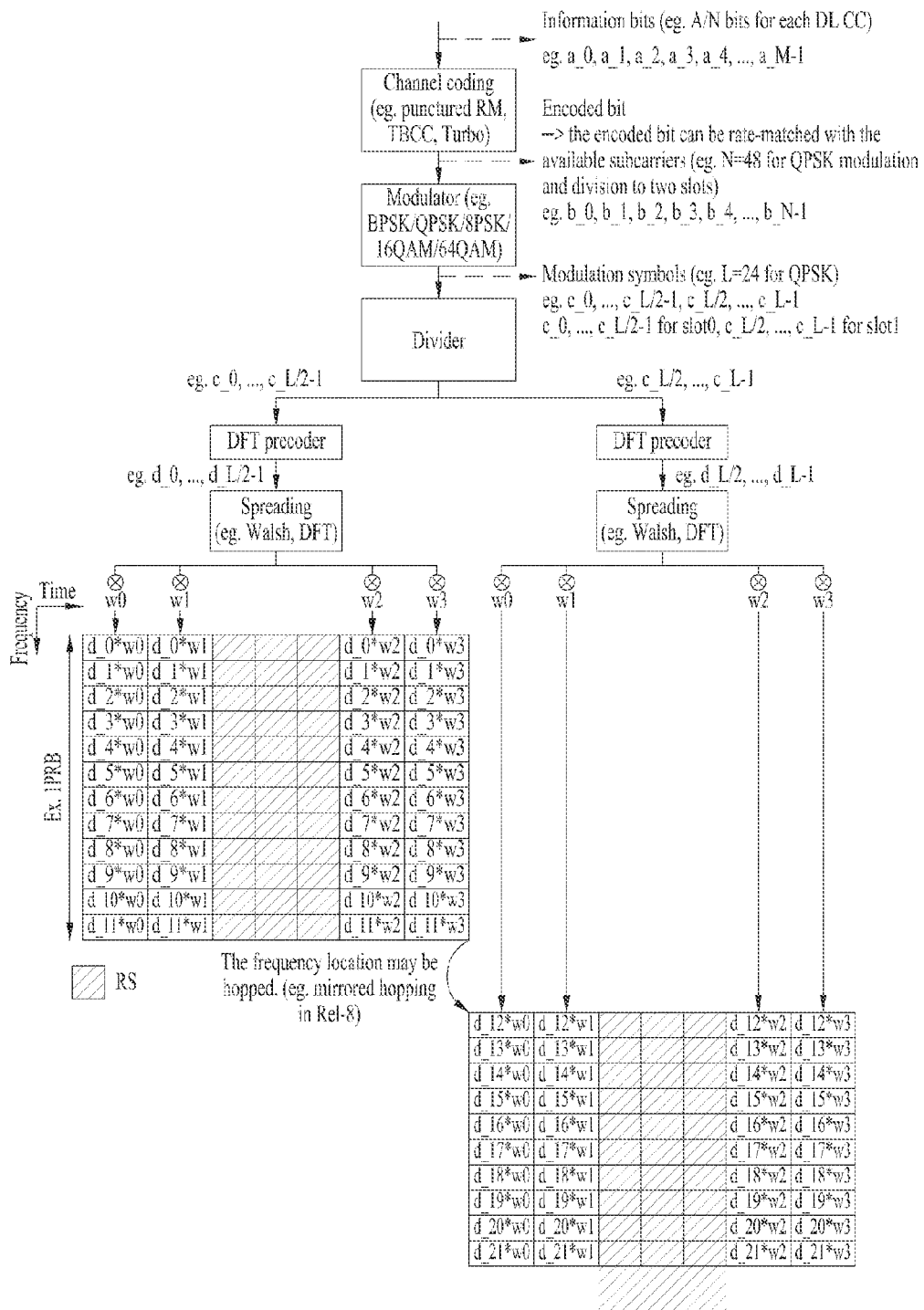

Reuse of LTE PUCCH format 2 structure (normal CP case)

Reuse of LTE PUCCH format 2 structure (extended CP case)

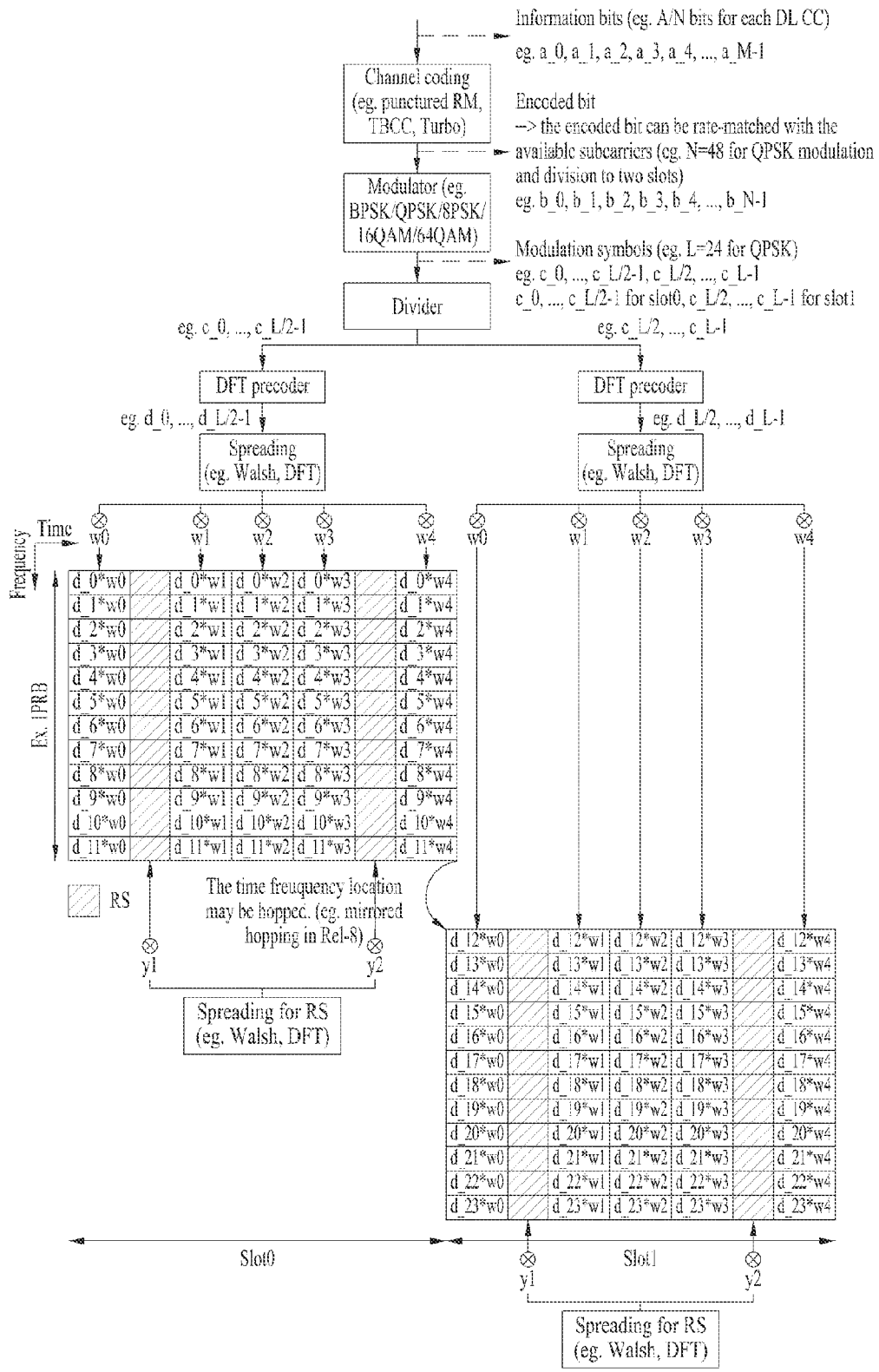

METHOD AND APPARATUS FOR TRANSMITTING CONTROL INFORMATION IN RADIO COMMUNICATION SYSTEM

CROSS-REFERENCE TO RELATED APPLICATIONS

Pursuant to 35 U.S.C. §119, this application claims the benefit of earlier filing date and right of priority to Korean Application No. 10-2011-0103022, filed on Oct. 10, 2011 and U.S. Provisional application Ser. No. 61/409,124, filed on Nov. 2, 2010, the contents of which are incorporated by reference herein in their entirety.

DESCRIPTION

1. Technical Field

The present invention relates to a wireless communication system, and more particularly, to a method and apparatus for transmitting control information in a wireless communication system supporting carrier aggregation (CA).

2. Background Art

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DISCLOSURE

Technical Problem

An object of the present invention is to provide a method and apparatus for efficiently transmitting control information in a wireless communication system. Another object of the present invention is to provide a channel format and a signal processing method and apparatus for efficiently transmitting control information. Another object of the present invention is to provide a method and apparatus for efficiently allocating resources used to transmit control information.

The technical problems solved by the present invention are not limited to the above technical problems and those skilled in the art can understand other technical problems from the following description.

Technical Solution

To achieve these objects and other advantages and in accordance with the purpose of the invention, as embodied and broadly described herein, a method for transmitting control information using Physical Uplink Control Channel PUCCH) format 3 by a communication apparatus in a radio communication system, including detecting one or more Physical Downlink Control Channels (PDCCHs), receiving one or more Physical Downlink Shared Channel (PDSCH) signals corresponding to the one or more PDCCHs, and determining a PUCCH resource value $n_{PUCCH}^{(3,p)}$ among a plurality of PUCCH resource values configured by a higher layer for the PUCCH format 3, the PUCCH resource value $n_{PUCCH}^{(3,p)}$ corresponding to a value of a transmit power control (TPC) field of a PDCCH for a PDSCH signal on a secondary cell (SCell) according to the following table, wherein, if a single antenna port transmission mode is configured, the PUCCH resource value $n_{PUCCH}^{(3,p)}$ indicated by the TPC field is mapped to one PUCCH resource for a single antenna port, and wherein, if a multi-antenna port transmission mode is configured, the PUCCH resource value $n_{PUCCH}^{(3,p)}$ indicated by the TPC field is mapped to a plurality of PUCCH resources for multiple antenna ports:

| Value of TPC field | $n_{PUCCH}^{(3,p)}$ |
|---|---|
| 00 | First PUCCH resource value configured by higher layer |
| 01 | Second PUCCH resource value configured by higher layer |
| 10 | Third PUCCH resource value configured by higher layer |
| 11 | Fourth PUCCH resource value configured by higher layer | where, p denotes an antenna port number.

In another aspect of the present invention, a communication apparatus configured to transmit control information using Physical Uplink Control Channel (PUCCH) format 3 in a radio communication system, including a radio frequency (RF) unit, and a processor configured to detect one or more Physical Downlink Control Channels (PDCCHs), receive one or more Physical Downlink Shared Channel (PDSCH) signals corresponding to the one or more PDCCHs, and determine a PUCCH resource value $n_{PUCCH}^{(3,p)}$ among a plurality of PUCCH resource values configured by a higher layer for the PUCCH format 3, the PUCCH resource value $n_{PUCCH}^{(3,p)}$ corresponding to a value of a transmit power control (TPC) field of a PDCCH for a PDSCH signal on a secondary cell (SCell) according to the following table, wherein, if a single antenna port transmission mode is configured, the PUCCH resource value $n_{PUCCH}^{(3,p)}$ indicated by the TPC field is mapped to one PUCCH resource for a single antenna port, and wherein, if a multi-antenna port transmission mode is configured, the PUCCH resource value $n_{PUCCH}^{(3,p)}$ indicated by the TPC field is mapped to a plurality of PUCCH resources for multiple antenna ports:

| Value of TPC field | $n_{PUCCH}^{(3,p)}$ |
|---|---|
| 00 | First PUCCH resource value configured by higher layer |
| 01 | Second PUCCH resource value configured by higher layer |
| 10 | Third PUCCH resource value configured by higher layer |
| 11 | Fourth PUCCH resource value configured by higher layer | where, p denotes an antenna port number.

If the single antenna port transmission mode is configured, the PUCCH resource value $n_{PUCCH}^{(3,p)}$ may be mapped to a PUCCH resource $n_{PUCCH}^{(3,p0)}$ for an antenna port p0, and if the multi-antenna port transmission is configured, the PUCCH resource $n_{PUCCH}^{(3,p)}$ may be mapped to a PUCCH resource $n_{PUCCH}^{(3,p0)}$ for an antenna port p0 and a PUCCH resource $n_{PUCCH}^{(3,p1)}$ for an antenna port p1.

A value of a TPC field of a PDCCH for a PDSCH signal on a primary cell (PCell) may be used to control transmit power for the PUCCH format 3.

If the one or more PDSCH signals include a plurality of PDSCH signals on SCells, the values of the TPC fields of a plurality of PDCCHs corresponding to a plurality of PDSCHs on the SCells may be the same.

The control information may include Hybrid Automatic Repeat reQuest Acknowledgement (HARQ-ACK) for the PDSCH signal.

The method may further include receiving allocation information indicating a plurality of PUCCH resources for an antenna port p0, and allocation information indicating a plurality of PUCCH resources for an antenna port p1 is additionally received only when multi-antenna port transmission is possible or when the multi-antenna port transmission mode is configured. The higher layer includes a radio resource control layer (RRC) layer.

The communication apparatus may transmit the control information using one or more PUCCH resources to which the PUCCH resource value $n_{PUCCH}^{(3,\tilde{p})}$ is mapped.

Advantageous Effects

According to the present invention, it is possible to efficiently transmit control information in a wireless communication system. In addition, it is possible to provide a channel format and a signal processing method for efficiently transmitting control information. In addition, it is possible to efficiently allocate resources used to transmit control information.

The effects of the present invention are not limited to the above-described effects and those skilled in the art can understand other effects from the following description.

DESCRIPTION OF DRAWINGS

The accompanying drawings which are included as a portion of the detailed description in order to help understanding of the present invention provide embodiments of the present invention and describes technical mapping of the present invention along with the detailed description.

FIG. 5 is a diagram showing a signal mapping scheme on a frequency domain satisfying a single carrier property.

FIG. 17 is a diagram showing ACK/NACK channelization of PUCCH formats 1a and 1b.

FIGS. 29A to 29F are diagrams showing a structure of PUCCH format 3 and a signal processing procedure therefor.

FIGS. 30 to 31 are diagrams showing a PUCCH format with an increased RS multiplexing capacity and a signal processing procedure according to an embodiment of the present invention.

MODE FOR INVENTION

The following technologies may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, or a Single Carrier Frequency Division Multiple Access (SC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS). A 3$^{rd}$ Generation Partnership Project Long Term Evolution (3GPP LTE) communication system is part of the E-UMTS (Evolved UMTS), which employs an OFDMA system in downlink and employs an SC-FDMA system in uplink. LTE-A (Advanced)

is an evolved version of 3GPP LTE. In order to clarify the description, the 3GPP LTE/LTE-A will be focused upon, but the technical scope of the present invention is not limited thereto.

In a radio communication system, a user equipment (UE) receives information from a base station (BS) in the downlink (DL) and transmits information to the BS in the uplink (UL). Information transmitted and received between the BS and the UE includes data and a variety of control information and various physical channels are present according to the kind/usage of the transmitted and received information.

Figure 1:
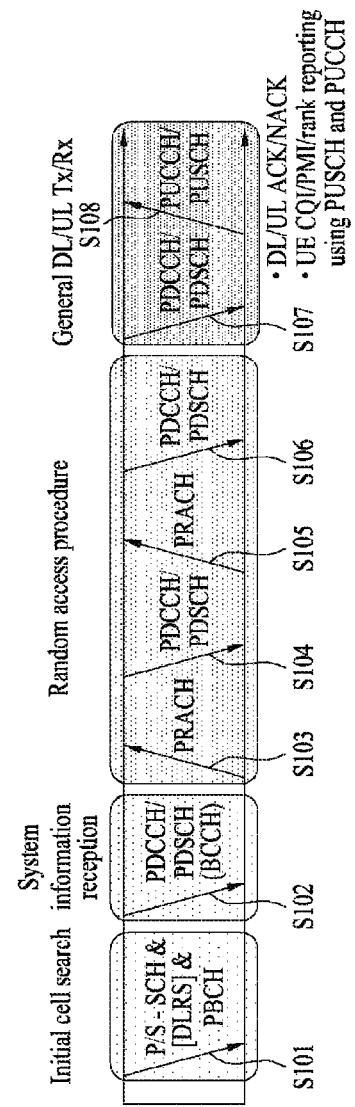
FIG. 1 is a view showing physical channels used for a 3$^{rd}$ Generation Partnership Project (3GPP) Long Term Evolution (LTE) system, which is an example of a wireless communication system, and a general signal transmission method using the same.

FIG. 1 is a view showing physical channels used for a $3^{rd}$ Generation Partnership Project (3GPP) Long Term Evolution (LTE) system and a general signal transmission method using the same.

When a UE is powered on or when the UE newly enters a cell, the UE performs an initial cell search operation such as synchronization with a BS in step S101. For the initial cell search operation, the UE may receive a Primary Synchronization Channel (P-SCH) and a Secondary Synchronization Channel (S-SCH) from the BS so as to perform synchronization with the BS, and acquire information such as a cell ID. Thereafter, the UE may receive a physical broadcast channel from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S102.

Thereafter, the UE may perform a random access procedure in steps S103 to S106, in order to complete the access to the eNB. For the random access procedure, the UE may transmit a preamble via a Physical Random Access Channel (PRACH) (S103), and may receive a message in response to the preamble via the PDCCH and the PDSCH corresponding thereto (S104). In contention-based random access, a contention resolution procedure including the transmission of an additional PRACH (S105) and the reception of the PDCCH and the PDSCH corresponding thereto (S106) may be performed.

The UE which performs the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure. Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality indication (CQI), precoding matrix indication (PMI), rank indication (RI), etc. In the present specification, HARQ ACK/NACK is briefly referred to as HARQ-ACK or ACK/NACK (A/N). HARQ-ACK includes at least one of a positive ACK (ACK), a negative NACK (ACK), DTX and NACK/DTX The UCI is generally transmitted via a PUCCH. However, in the case where control information and traffic data are simultaneously transmitted, the UCI may be transmitted via a PUSCH. The UCI may be aperiodically transmitted via a PUSCH according to a network request/instruction.

Figure 2:
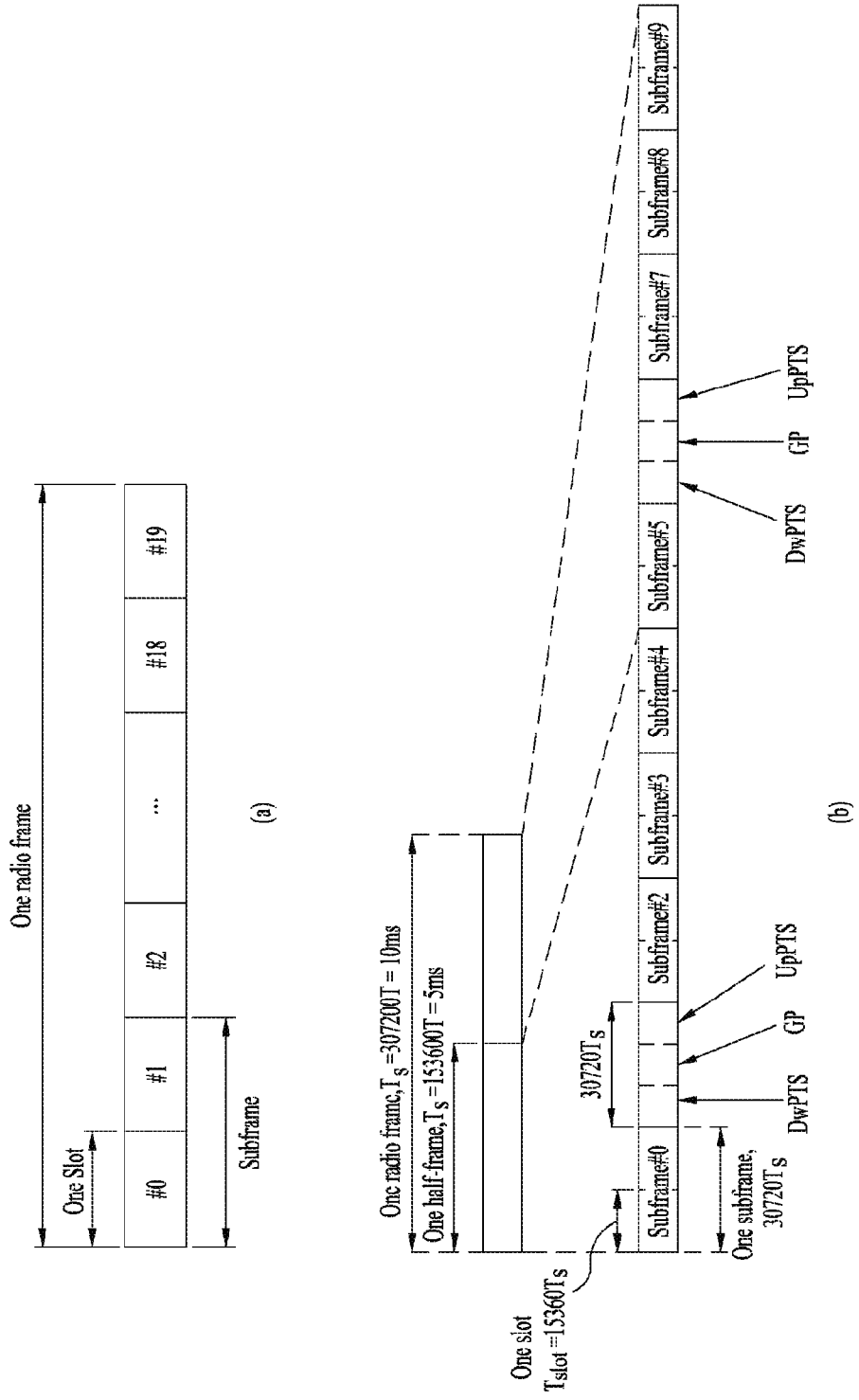
FIG. 2 is a diagram showing a structure of a radio frame.

FIG. 2 is a diagram showing the structure of a radio frame. In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD).

FIG. 2(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0. 5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol part. The OFDM symbol may be referred to as an SC-FDMA symbol or symbol part. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 2(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

Figure 3A:
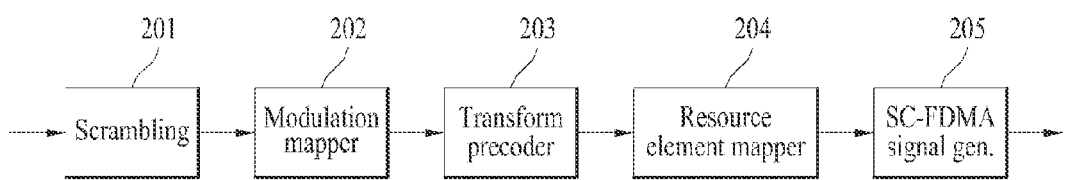
FIG. 3A is a diagram showing an uplink signal processing procedure.

FIG. 3A is a view explaining a signal processing procedure of transmitting an uplink (UL) signal at a UE.

In order to transmit the UL signal, a scrambling module 201 of the UE may scramble a transmitted signal using a UE-specific scrambling signal. The scrambled signal is input to a modulation mapper 202 so as to be modulated into complex symbols by a Binary Phase Shift Keying (BPSK), Quadrature Phase Shift Keying (QPSK), 16-Quadrature amplitude modulation (QAM) or 64-QAM scheme according to the kind of the transmitted signal and/or the channel state. Thereafter, the modulated complex symbols are processed by a transform precoder 203 and are input to a resource element mapper 204. The resource element mapper 204 may map the complex symbols to time-frequency resource elements. The processed signal may be transmitted to the BS via an SC-FDMA signal generator 205 and an antenna.

Figure 3B:
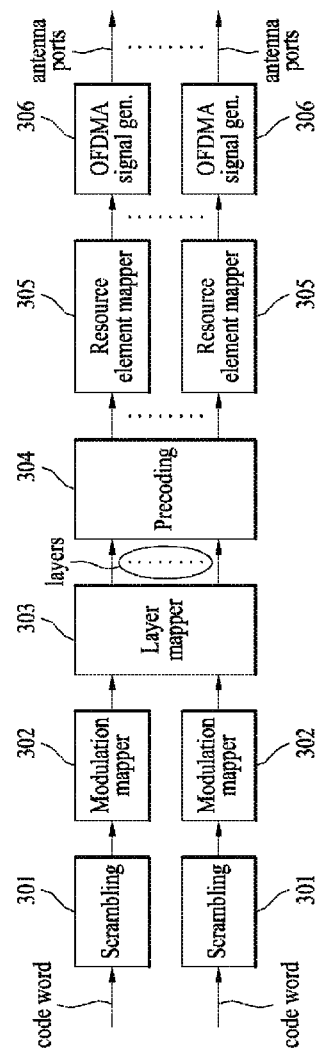
FIG. 3B is a diagram showing a downlink signal processing procedure.

FIG. 3B is a diagram explaining a signal processing procedure of transmitting a downlink (DL) signal at a BS.

In a 3GPP LTE system, the BS may transmit one or more codewords in the downlink. Accordingly, one or more codewords may be processed to configure complex symbols by scrambling modules 301 and modulation mappers 302, similar to the UL transmission of FIG. 3A. Thereafter, the complex symbols are mapped to a plurality of layers by a layer mapper 303, and each layer may be multiplied by a precoding matrix by a precoding module 304 and may be allocated to each transmission antenna. The processed signals which will respectively be transmitted via antennas may be mapped to time-frequency resource elements by resource element mappers 305, and may respectively be transmitted via OFDM signal generators 306 and antennas.

In a radio communication system, in a case where a UE transmits a signal in the uplink, a Peak-to-Average Ratio (PAPR) may be more problematic than the case where a BS transmits a signal in the downlink. Accordingly, as described above with reference to FIGS. 3A and 3B, an OFDMA scheme is used to transmit a downlink signal, while an SC-FDMA scheme is used to transmit an uplink signal.

Figure 4:
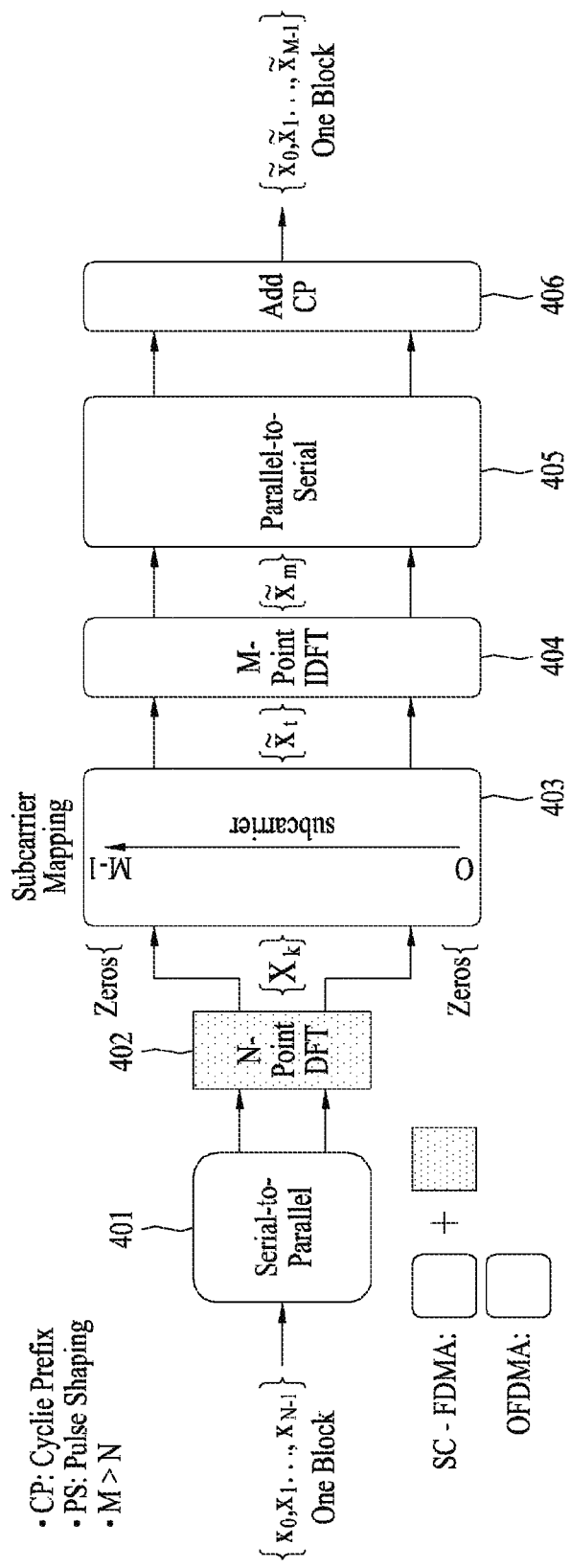
FIG. 4 is a diagram showing a Single Carrier Frequency Division Multiple Access (SC-FDMA) scheme and an Orthogonal Frequency Division Multiple Access (OFDMA) scheme.

FIG. 4 is a diagram explaining an SC-FDMA scheme and an OFDMA scheme. In the 3GPP system, the OFDMA scheme is used in the downlink and the SC-FDMA is used in the uplink.

Referring to FIG. 4, a UE for UL signal transmission and a BS for DL signal transmission are identical in that a serial-to-parallel converter 401, a subcarrier mapper 403, an M-point Inverse Discrete Fourier Transform (IDFT) module 404, parallel-to-serial converter 405 and a Cyclic Prefix (CP) adding module 406 are included. The UE for transmitting a signal using an SC-FDMA scheme further includes an N-point DFT module 402. The N-point DFT module 402 partially offsets an IDFT process influence of the M-point IDFT module 404 such that the transmitted signal has a single carrier property.

FIG. 5 is a diagram explaining a signal mapping scheme in a frequency domain satisfying the single carrier property in the frequency domain. FIG. 5(a) shows a localized mapping scheme and FIG. 5(b) shows a distributed mapping scheme.

A clustered SC-FDMA scheme which is a modified form of the SC-FDMA scheme will now be described. In the clustered SC-FDMA scheme, DFT process output samples are divided into sub-groups in a subcarrier mapping process and are non-contiguously mapped in the frequency domain (or subcarrier domain).

Figure 6:
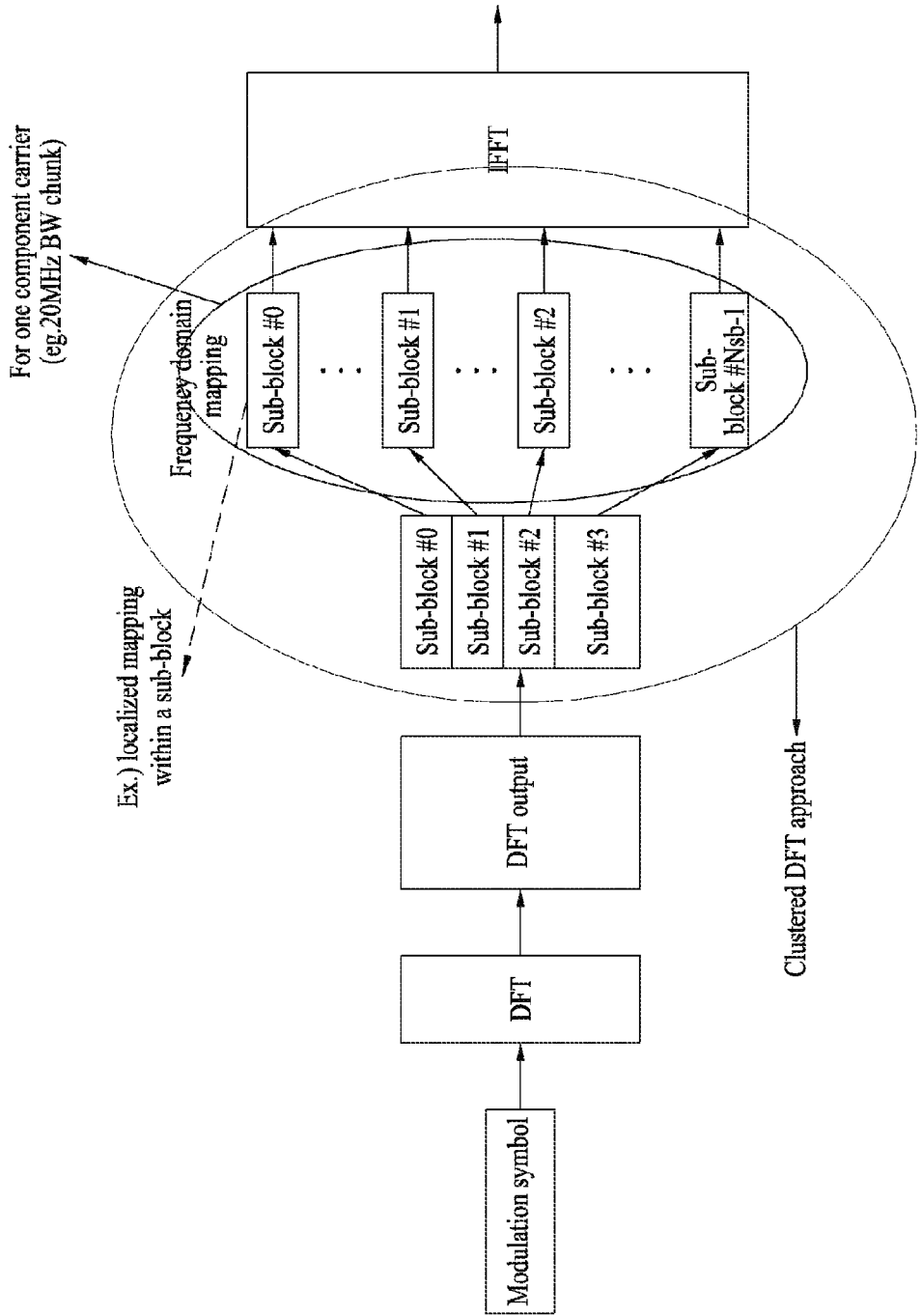
FIG. 6 is a diagram showing a signal processing procedure of mapping DFT process output samples to a single carrier in a clustered SC-FDMA.
Figure 7:
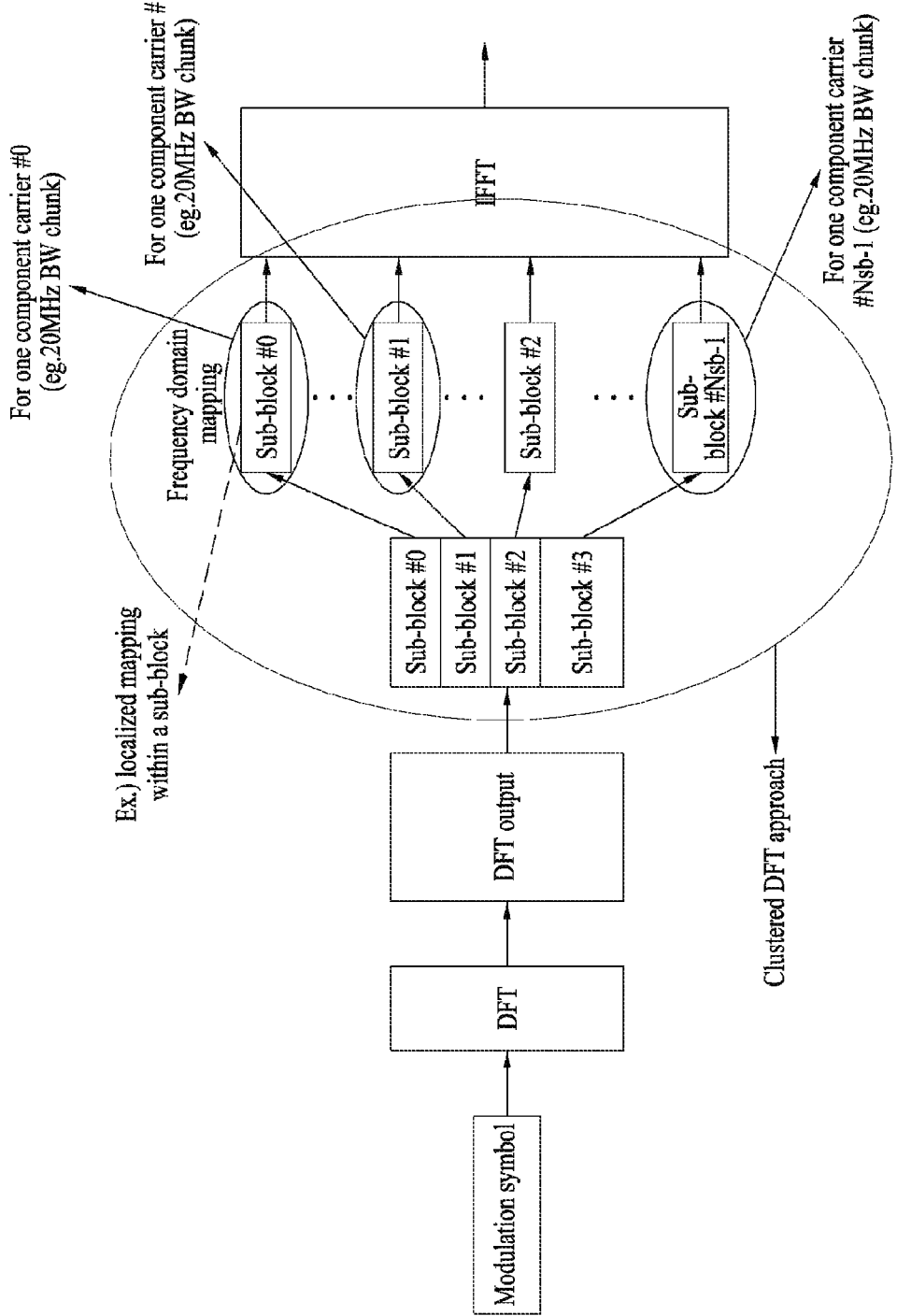
FIGS. 7 and 8 are diagrams showing a signal processing procedure of mapping DFT process output samples to multiple carriers in a clustered SC-FDMA scheme.
Figure 8:
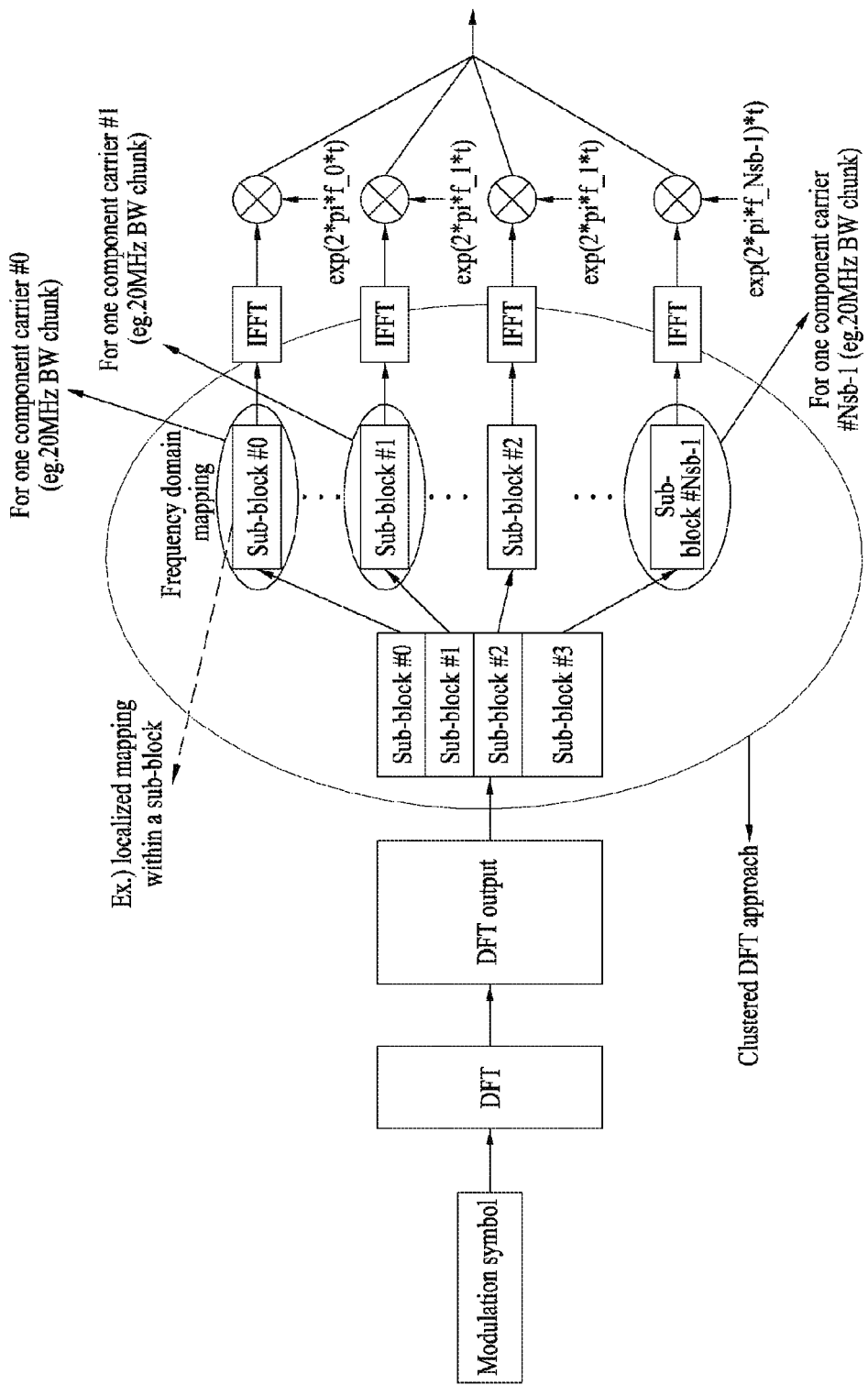

FIG. 6 is a diagram showing a signal processing procedure in which DFT process output samples are mapped to a single carrier in a clustered SC-FDMA scheme. FIGS. 7 and 8 are diagrams showing a signal processing procedure in which DFT process output samples are mapped to multiple carriers in a clustered SC-FDMA scheme. FIG. 6 shows an example of applying an intra-carrier clustered SC-FDMA scheme and FIGS. 7 and 8 show examples of applying an inter-carrier clustered SC-FDMA scheme. FIG. 7 shows the case where a subcarrier spacing between contiguous component carriers is configured and a signal is generated by a single IFFT block in a state in which component carriers are contiguously allocated in a frequency domain and FIG. 8 shows the case where a signal is generated by a plurality of IFFT blocks in a state in which component carriers are non-contiguously allocated in a frequency domain.

Figure 9:
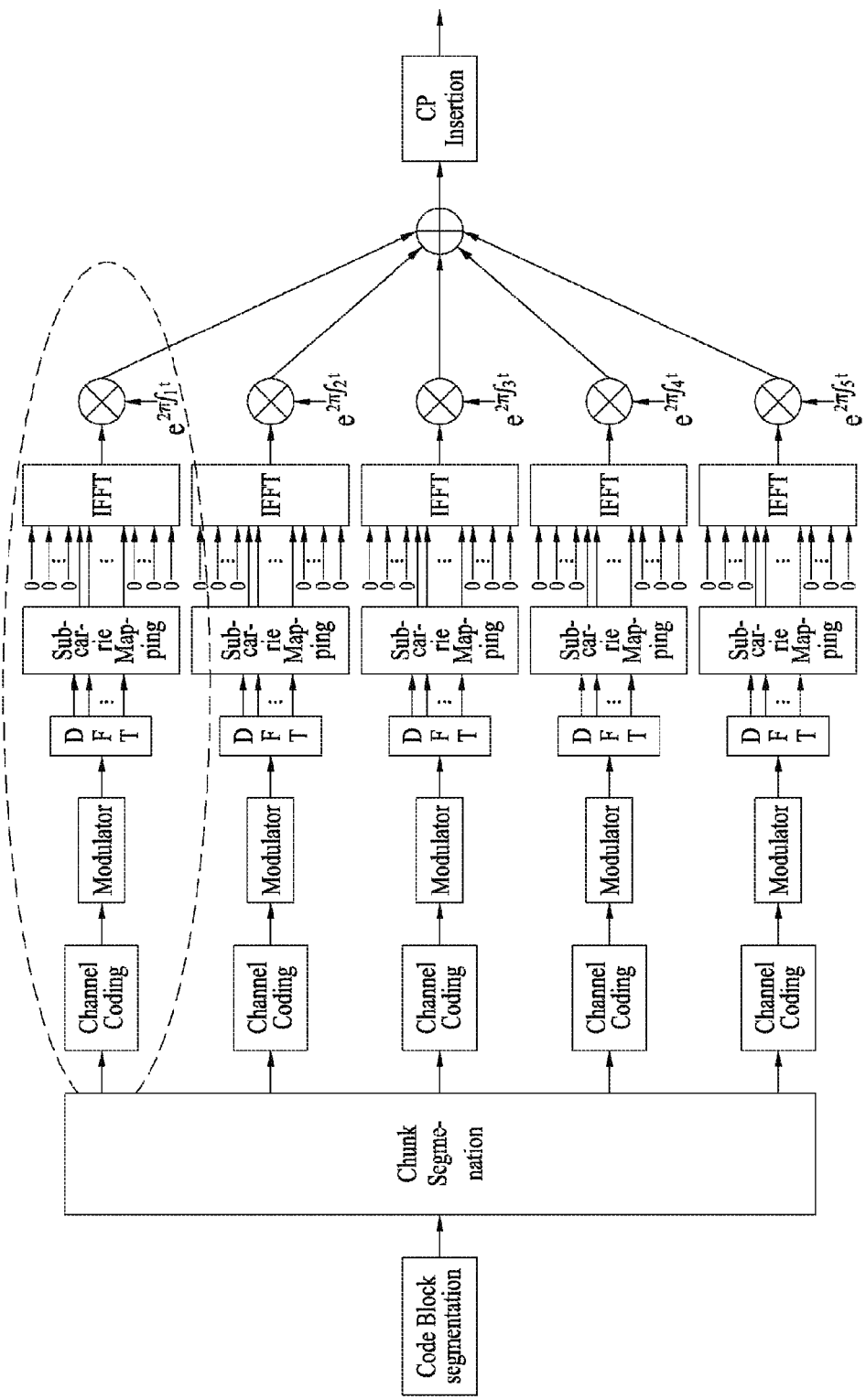
FIG. 9 is a diagram showing a signal processing procedure in a segmented SC-FDMA scheme.

FIG. 9 is a diagram showing a signal processing procedure in a segmented SC-FDMA scheme.

In the segmented SC-FDMA scheme, IFFTs corresponding in number to a certain number of DFTs are applied such that the DFTs and the IFFTs are in one-to-one correspondence and DFT spreading of the conventional SC-FDMA scheme and the frequency subcarrier mapping configuration of the IFFTs are extended. Therefore, the segmented SC-FDMA scheme also referred to as an N×SC-FDMA or N×DFT-s-OFDMA scheme. In the present specification, the generic term "segmented SC-FDMA" is used. Referring to FIG. 9, the segmented SC-FDMA scheme is characterized in that modulation symbols of an entire time domain are grouped into N (N is an integer greater than 1) groups and a DFT process is performed on a group unit basis, in order to relax a single carrier property.

Figure 10:
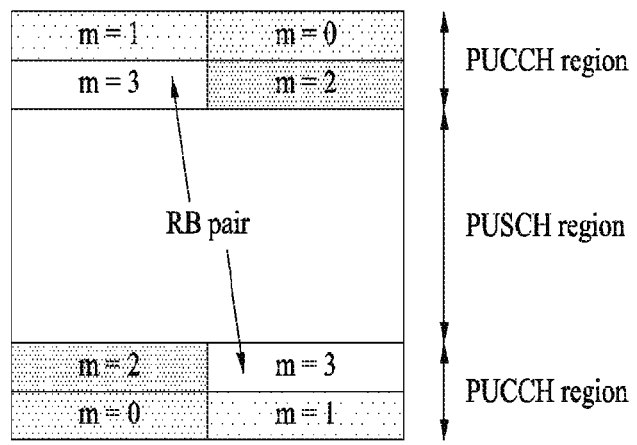
FIG. 10 is a diagram showing the structure of an uplink subframe.

FIG. 10 is a diagram showing the structure of a UL subframe.

Referring to FIG. 10, the UL subframe includes a plurality of slots (e.g., two). Each slot may include SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes an RB pair (e.g., m=0, 1, 2, 3) (e.g., an RB pair of frequency-mirrored locations) located at both ends of the data region on the frequency axis and hops between slots. The UL control information (that is, UCI) includes HARQ ACK/NACK, Channel Quality Information (CQI), Precoding Matrix Indicator (PMI) Rank Indication (RI), etc.

Figure 11:
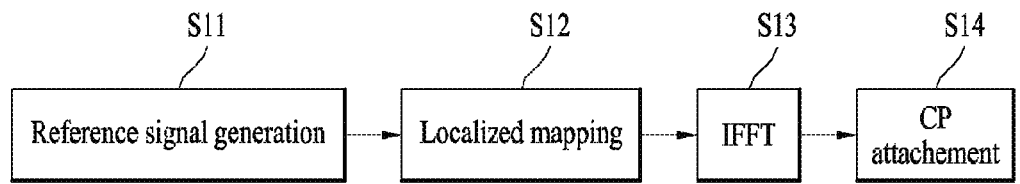
FIG. 11 is a diagram showing a signal processing procedure of transmitting a reference signal (RS) in the uplink.

FIG. 11 is a diagram illustrating a signal processing procedure for transmitting a Reference Signal (RS) in the uplink. Data is transformed into a frequency domain signal by a DFT precoder, subjected to frequency mapping and IFFT, and transmitted. In contrast, an RS does not pass through a DFT precoder. More specifically, an RS sequence is directly generated in a frequency domain (step 11), subjected to a localized-mapping process (step 12), subjected to IFFT (step 13), subjected to a CP attachment process (step 14), and transmitted.

The RS sequence $r_{u,v}^{(\alpha)}(n)$ is defined by cyclic shift a of a base sequence and may be expressed by Equation 1.

$$r_{u,v}^{(\alpha)}(n)=e^{j\alpha n}\bar{r}_{u,v}(n), 0\leq n<M_{sc}^{RS} \quad \text{Equation 1}$$

where, $M_{sc}^{RS}=mN_{sc}^{RB}$ denotes the length of the RS sequence, $N_{sc}^{RB}$ denotes the size of a resource block represented in subcarrier units, and m is $1\leq m\leq N_{RB}^{max,UL}$. $N_{RB}^{max,UL}$ denotes a maximum UL transmission band.

A base sequence $\bar{r}_{u,v}(n)$ is grouped into several groups. $u\in\{0, 1, \ldots, 29\}$ denotes a group number, and v corresponds to a base sequence number in a corresponding group. Each group includes one base sequence v=0 with a length of $M_{sc}^{RS}=mN_{sc}^{RB}$ ($1\leq m\leq 5$) and two base sequences v=0,1 with a length of $M_{sc}^{RS}=mN_{sc}^{RB}$ ($6\leq m\leq N_{RB}^{max,UL}$). The sequence group number u and the number v within a corresponding group may be changed with time. Definition of the base sequence $\bar{r}_{u,v}(0), \ldots, \bar{r}_{u,v}(M_{sc}^{RS}-1)$ follows a sequence length $M_{sc}^{RS}$.

The base sequence having a length of $3N_{sc}^{RB}$ or more may be defined as follows.

With respect to $M_{sc}^{RS}\geq 3N_{sc}^{RB}$, the base sequence $\bar{r}_{u,v}(0), \ldots, \bar{r}_{u,v}(M_{sc}^{RS}-1)$ is given by the following Equation 2.

$$\bar{r}_{u,v}(n)=x_q(n \bmod N_{ZC}^{RS}), 0\leq n<M_{sc}^{RS} \quad \text{Equation 2}$$

where, a q-th root Zadoff-Chu sequence may be defined by the following Equation 3.

$$x_q(m) = e^{-j\frac{\pi qm(m+1)}{N_{ZC}^{RS}}}, 0 \leq m \leq N_{ZC}^{RS} - 1 \quad \text{Equation 3}$$

where, q satisfies the following equation 4.

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31 \quad \text{Equation 4}$$

where, the length $N_{ZC}^{RS}$ of the Zadoff-Chu sequence is given by a largest prime number and thus $N_{ZC}^{RS} < M_{sc}^{RS}$ is satisfied.

A base sequence having a length of less than $3N_{sc}^{RB}$ may be defined as follows. First, with respect to $M_{sc}^{RS} = N_{sc}^{RB}$ and $M_{sc}^{RS} = 2N_{sc}^{RB}$, the base sequence is given as shown in Equation 5.

$$\bar{r}_{u,v}(n) = e^{j\phi(n)\pi/4}, 0 \leq n \leq M_{sc}^{RS} = 1 \quad \text{Equation 5}$$

where, values $\phi(n)$ for $M_{sc}^{RS} = N_{sc}^{RB}$ and $M_{sc}^{RS} = 2N_{sc}^{RB}$ are given by the following Table 1, respectively.

TABLE 1

| u | $\phi(0), \ldots, \phi(11)$ |
|---|---|
| 0 | -1  1  3 -3  3  3  1  1  3  1 -3  3 |
| 1 |  1  1  3  3  3 -1  1 -3 -3  1 -3  3 |

TABLE 1-continued

| u | $\phi(0), \ldots, \phi(11)$ |
|---|---|
| 2  |  1  1 -3 -3 -3 -1 -3 -3  1 -3  1 -1 |
| 3  | -1  1  1  1  1 -1 -3 -3  1 -3  3 -1 |
| 4  | -1  3  1 -1  1 -1 -3 -1  1 -1  1  3 |
| 5  |  1 -3  3 -1 -1  1  1 -1 -1  3 -3  1 |
| 6  | -1  3 -3 -3 -3  3  1 -1  3  3 -3  1 |
| 7  | -3 -1 -1 -1  1 -3  3 -1  1 -3  3  1 |
| 8  |  1 -3  3  1 -1 -1 -1  1  1  3 -1  1 |
| 9  |  1 -3 -1  3  3 -1 -3  1  1  1  1  1 |
| 10 |  1 -3 -1  1  1 -3 -3 -1 -3  3 -1 |
| 11 |  3  1 -1 -1  3  3 -3  1  3  1  3  3 |
| 12 |  1 -3  1  1 -3  1  1  1 -3 -3 -3  1 |
| 13 |  3  3 -3  3 -3  1  1  3 -1 -3  3  3 |
| 14 | -3  1 -1 -3 -1  3  1  3  3  3 -1  1 |
| 15 |  3 -1  1 -3 -1 -1  1  1  3  1 -1 -3 |
| 16 |  1  3  1 -1  1  3  3  3 -1 -1  3 -1 |
| 17 | -3  1  1  3 -3  3 -3 -3  3  1  3 -1 |
| 18 | -3  3  1  1 -3  1 -3 -3 -1 -1  1 -3 |
| 19 | -1  3  1  3  1 -1 -1  3 -3 -1 -3 -1 |
| 20 | -1 -3  1  1  1  1  3  1 -1  1 -3 -1 |
| 21 | -1  3 -1  1 -3 -3 -3 -3 -3  1 -1 -3 |
| 22 |  1  1 -3 -3 -3 -3 -1  3 -3  1 -3  3 |
| 23 |  1  1 -1 -3 -1 -3  1 -1  1  3 -1  1 |
| 24 |  1  1  3  1  3  3 -1  1 -1 -3 -3  1 |
| 25 |  1 -3  3  3  1  3  3  1 -3 -1 -1  3 |
| 26 |  1  3 -3 -3  3 -3  1 -1 -1  3 -1 -3 |
| 27 | -3 -1 -3 -1 -3  3  1 -1  1  3 -3 -3 |
| 28 | -1  3 -3  3 -1  3  3 -3  3  3 -1 -1 |
| 29 |  3 -3 -3 -1 -1 -3 -1  3 -3  3  1 -1 |

TABLE 2

| u | $\phi(0), \ldots, \phi(23)$ |
|---|---|
| 0  | -1  3  1 -3  3 -1  1  3 -3  3  1  3 -3  3  1  1 -1  1  3 -3  3 -3 -1 -3 |
| 1  | -3  3 -3 -3 -3  1 -3 -3  3 -1  1  1  1  3  1 -1  3 -3 -3  1  3  1  1 -3 |
| 2  |  3 -1  3  3  1  1 -3  3  3  3  3  1 -1  3 -1  1  1 -1 -3 -1 -1  1  3  3 |
| 3  | -1 -3  1  1  3 -3  1  1 -3 -1 -1  1  3  1  3  1 -1  3  1  1 -3 -1 -3 -1 |
| 4  | -1 -1 -1 -3 -3 -1  1  1  3  3 -1  3 -1  1 -1 -3  1 -1 -3 -3  1 -3 -1 -1 |
| 5  | -3  1  1  3 -1  1  3  1 -3  1 -3  1  1 -1 -1  3 -1 -3  3 -3 -3 -3  1  1 |
| 6  |  1  1 -1 -1  3 -3 -3  3 -3  1 -1 -1  1 -1  1  1 -1 -3 -1  1 -1  3 -1 -3 |
| 7  | -3  3  3 -1 -1 -3 -1  3  1  3  1  3  1  1 -1  3  1 -1  1  3 -3 -1 -1  1 |
| 8  | -3  1  3 -3  1 -1 -3  3 -3  3 -1 -1 -1 -1  1 -3 -3 -3  1 -3 -3 -3  1 -3 |
| 9  |  1  1 -3  3  3 -1 -3 -1  3 -3  3  3  3 -1  1  1 -3  1 -1  1  1 -3  1  1 |
| 10 | -1  1 -3 -3  3 -1  3 -1 -1 -3 -3 -3 -1 -3 -3  1 -1  1  3  3 -1  1 -1  3 |
| 11 |  1  3  3 -3 -3  1  3  1 -1 -3 -3 -3  3  3 -3  3  3 -1 -3  3 -1  1 -3  1 |
| 12 |  1  3  3  1  1  1 -1 -1  1 -3  3 -1  1  1 -3  3  3 -1 -3  3 -3 -1 -3 -1 |
| 13 |  3 -1 -1 -1 -1 -3 -1  3  3  1 -1  1  3  3  3 -1  1  1 -3  1  3 -1 -3  3 |
| 14 | -3 -3  3  1  3  1 -3  3  1  3  1  1  3  3 -1 -1 -3  1 -3 -1  3  1  1  3 |
| 15 | -1 -1  1 -3  1  3 -3  1 -1 -3 -1  3  1  3  1 -1 -3 -3 -1 -1 -3 -3 -3 -1 |
| 16 | -1 -3  3 -1 -1 -1 -1  1  1 -3  3  1  3  3  1 -1  1 -3  1 -3  1  1 -3 -1 |
| 17 |  1  3 -1  3  3 -1 -3  1 -1 -3  3  3  3 -1  1  1  3 -1 -3 -1  3 -1 -1 -1 |
| 18 |  1  1  1  1  1 -1  3 -1 -3  1  1  3 -3  1 -3 -1  1  1 -3 -3  3  1  1 -3 |
| 19 |  1  3  3  1 -1 -3  3 -1  3  3 -3  3 -1 -1  1 -1 -3 -1  1  3 -1  3 -3 -3 |
| 20 | -1 -3  3 -3 -3 -3 -1 -1 -3 -1 -3  3  1  3 -3 -1  3 -1  1 -1  3 -3  1 -1 |
| 21 | -3 -3  1  1 -1  1 -1  1 -1  3  1 -3 -1  1 -1  1 -1 -1  3  3 -3 -1  1 -3 |
| 22 | -3 -1 -3  3  1 -1 -3 -1 -3 -3  3 -3  3 -3 -1  1  3  1 -3  1  3  3 -1 -3 |
| 23 | -1 -1 -1 -1  3  3  3  1  3  3 -3  1  3 -1  3 -1  3  3 -3  3  1 -1  3  3 |
| 24 |  1 -1  3  3 -1 -3  3 -3 -1 -1  3 -1  3 -1 -1  1  1  1  1 -1 -1 -3 -1  3 |
| 25 |  1 -1  1 -1  3 -1  3  1  1 -1 -1 -3  1  1 -3  1  3 -3  1  1 -3 -3 -1 -1 |
| 26 | -3 -1  1  3  1  1 -3 -1 -1 -3  3 -3  3  1 -3  3 -3  1 -1  1 -3  1  1  1 |

TABLE 2-continued

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

RS hopping will now be described.

The sequence group number u in a slot $n_s$ may be defined as shown in the following Equation 6 by a group hopping pattern $f_{gh}(n_s)$ and a sequence shift pattern $f_{ss}$.

$$u = (f_{gh}(n_s) + f_{ss}) \bmod 30 \quad \text{Equation 6}$$

where, mod denotes a modulo operation.

17 different hopping patterns and 30 different sequence shift patterns are present. Sequence group hopping may be enabled or disabled by a parameter for activating group hopping provided by a higher layer.

A PUCCH and a PUSCH may have the same hopping pattern, but have different sequence shift patterns.

The group hopping pattern $f_{gh}(n_s)$ is the same in the PUSCH and the PUCCH and is given by the following Equation 7.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{Equation 7}$$

where, c(i) denotes a pseudo-random sequence and a pseudo-random sequence generator may be initialized by $$c_{init} = \left\lfloor \frac{N_{ID}^{cell}}{30} \right\rfloor$$

at the start of each radio frame.

The PUCCH and the PUSCH are different in definition of the sequence shift pattern $f_{ss}$.

The sequence shift pattern $f_{ss}^{PUCCH}$ of the PUCCH is $f_{ss}^{PUCCH} = N_{ID}^{cell} \bmod 30$) and the sequence shift pattern $f_{ss}^{PUSCH}$ of the PUSCH is $f_{ss}^{PUSCH} = (f_{ss}^{PUCCH} + \Delta_{ss}) \bmod 30$. $\Delta_{ss} \in \{0, 1, \ldots, 29\}$ is configured by a higher layer.

Hereinafter, sequence hopping will be described.

Sequence hopping is applied only to a RS having a length of $M_{sc}^{RS} \geq 6N_{sc}^{RB}$.

With respect to an RS having a length of $M_{sc}^{RS} < 6N_{sc}^{RB}$, a base sequence number v within a base sequence group is v=0.

With respect to an RS having a length of $M_{sc}^{RS} \geq 6N_{sc}^{RB}$, a base sequence number v within a base sequence group in a slot $n_s$ is given by the following Equation 8.

$$v = \begin{cases} c(n_s) & \text{if group hopping is disabled and sequence hopping is enabled} \\ 0 & \text{otherwise} \end{cases} \quad \text{Equation 8}$$

where, c(i) denotes a pseudo-random sequence and a parameter for enabling sequence hopping provided by a higher layer determines whether sequence hopping is enabled. The pseudo-random sequence generator may be initialized by $$c_{init} = \left\lfloor \frac{N_{ID}^{cell}}{30} \right\rfloor \cdot 2^5 + f_{ss}^{PUSCH}$$

at the start of a radio frame.

An RS for a PUSCH is determined as follows.

The RS sequence $r^{PUSCH}(\cdot)$ for the PUCCH is defined by $r^{PUSCH}(m \cdot M_{sc}^{RS} + n) = r_{u,v}^{(\alpha)}(n)$. m and n satisfy $$m = 0, 1$$
$$n = 0, \ldots, M_{sc}^{RS} - 1$$

and satisfy $M_{sc}^{RS} = M_{sc}^{PUSCH}$.

In one slot, cyclic shift is $\alpha = 2\pi n_{cs}/12$ along with $n_{cs} = (n_{DMRS}^{(1)} + n_{DMRS}^{(2)} + n_{PRS}(n_s)) \bmod 12$.

$n_{DMRS}^{(1)}$ is a broadcast value, $n_{DMRS}^{(2)}$ is given by UL scheduling allocation, and $n_{PRS}(n_s)$ is a cell-specific cyclic shift value. $n_{PRS}(n_s)$ varies according to a slot number $n_s$, and is $$n_{PRS}(n_s) = \sum_{i=0}^{7} c(8 \cdot n_s + i) \cdot 2^i.$$

c(i) is a pseudo-random sequence and c(i) is a cell-specific value. The pseudo-random sequence generator may be initialized by $$c_{init} = \left\lfloor \frac{N_{ID}^{cell}}{30} \right\rfloor \cdot 2^5 + f_{ss}^{PUSCH}$$

at the start of a radio frame.

Table 3 shows a cyclic shift field and $n_{DMRS}^{(2)}$ at a downlink control information (DCI) format 0.

TABLE 3

| Cyclic shift field at DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for a UL RS at a PUSCH is as follows.

A sequence is multiplied by an amplitude scaling factor $\beta_{PUSCH}$ and is mapped to the same set of a physical resource block (PRB) used for the corresponding PUSCH within the sequence started at $r^{PUSCH}(0)$. l=3 for a normal CP and l=2 for an extended CP. When the sequence is mapped to a resource element (k,l) within a subframe, the order of k is first increased and the slot number is then increased.

In summary, if a length is greater than and equal to $3N_{sc}^{RB}$, a ZC sequence is used along with cyclic extension. If a length is less than $3N_{sc}^{RB}$, a computer-generated sequence is used. Cyclic shift is determined according to cell-specific cyclic shift, UE-specific cyclic shift and hopping pattern.

Figure 12A:
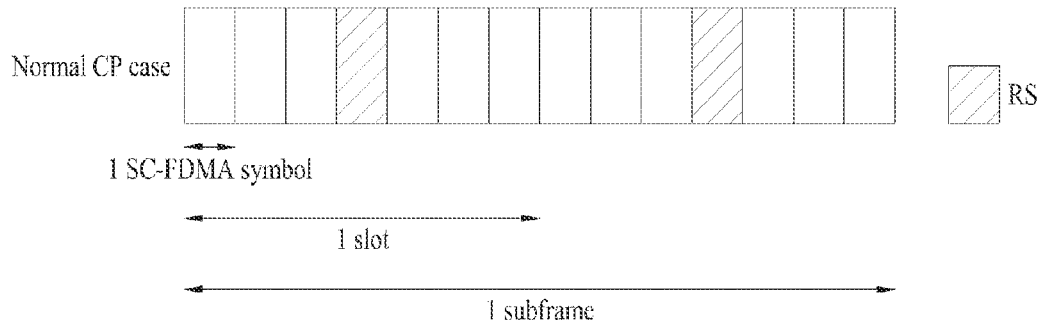
FIG. 12 is a diagram showing a demodulation reference signal (DMRS) for a physical uplink shared channel (PUSCH).
Figure 12B:
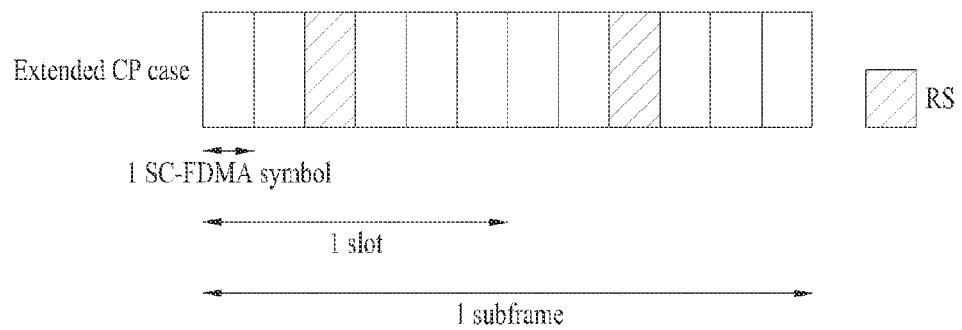

FIG. 12A is a diagram showing the structure of a demodulation reference signal (DMRS) for a PUSCH in the case of normal CP and FIG. 12B is a diagram showing the structure of a DMRS for a PUSCH in the case of extended CP. In FIG. 12A, a DMRS is transmitted via fourth and eleventh SC-FDMA symbols and, in FIG. 12B, a DMRS is transmitted via third and ninth SC-FDMA symbols.

FIGS. 13 to 16 show a slot level structure of a PUCCH format. The PUCCH includes the following formats in order to transmit control information.

(1) Format 1: This is used for on-off keying (OOK) modulation and scheduling request (SR)

(2) Format 1a and Format 1b: They are used for ACK/NACK transmission
  1) Format 1a: BPSK ACK/NACK for one codeword
  2) Format 1b: QPSK ACK/NACK for two codewords (3) Format 2: This is used for QPSK modulation and CQI transmission (4) Format 2a and Format 2b: They are used for CQI and ACK/NACK simultaneous transmission.

Table 4 shows a modulation scheme and the number of bits per subframe according to a PUCCH format. Table 5 shows the number of RSs per slot according to a PUCCH format. Table 6 shows SC-FDMA symbol locations of an RS according to a PUCCH format. In Table 4, the PUCCH formats 2a and 2b correspond to the normal CP case.

TABLE 4

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
| --- | --- | --- |
| 1, 1a, 1b | 3 | 2 |
| 2 | 2 | 1 |
| 2a, 2b | 2 | N/A |

TABLE 6

| | SC-FDMA symbol location of RS | |
| --- | --- | --- |
| PUCCH format | Normal CP | Extended CP |
| 1, 1a, 1b | 2, 3, 4 | 2, 3 |
| 2, 2a, 2b | 1, 5 | 3 |

Figure 13:
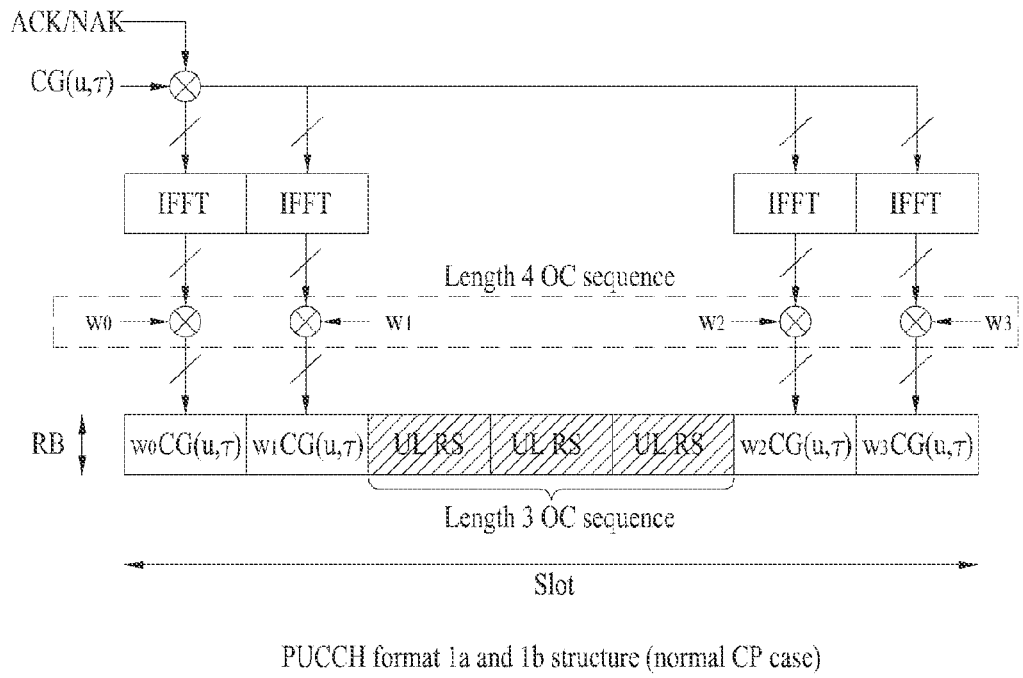
FIGS. 13 to 14 are diagrams showing slot level structures of physical uplink control channel (PUCCH) formats 1a and 1b.
Figure 14:
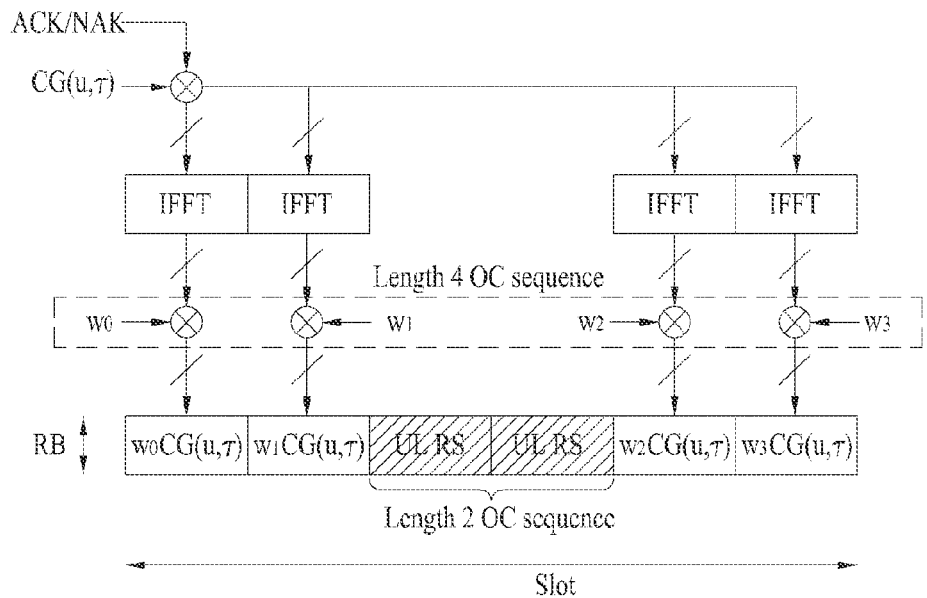

FIG. 13 shows PUCCH formats 1a and 1b in the normal CP case. FIG. 14 shows PUCCH formats 1a and 1b in the extended CP case. In the PUCCH formats 1a and 1b, the same control information is repeated within a subframe in slot units. Each UE transmits an ACK/NACK signal through different resources including different cyclic shifts (CSs) (frequency domain codes) of a computer-generated constant amplitude zero auto correlation (CG-CAZAC) sequence and orthogonal covers (OCs) or orthogonal cover codes (OCCs) (time domain codes). The OC includes, for example, a Walsh/DFT orthogonal code. If the number of CSs is 6 and the number of OCs is 3, a total of 18 UEs may be multiplexed in the same physical resource block (PRB) in the case of using a single antenna. Orthogonal sequences w0, w1, w2 and w3 may be applied in a certain time domain (after FFT modulation) or a certain frequency domain (before FFT modulation).

For SR and persistent scheduling, ACK/NACK resources including CSs, OCs and PRBs may be provided to a UE through radio resource control (RRC). For dynamic ACK/NACK and non-persistent scheduling, ACK/NACK resources may be implicitly provided to the UE by a lowest CCE index of a PDCCH corresponding to a PDSCH.

Figure 15:
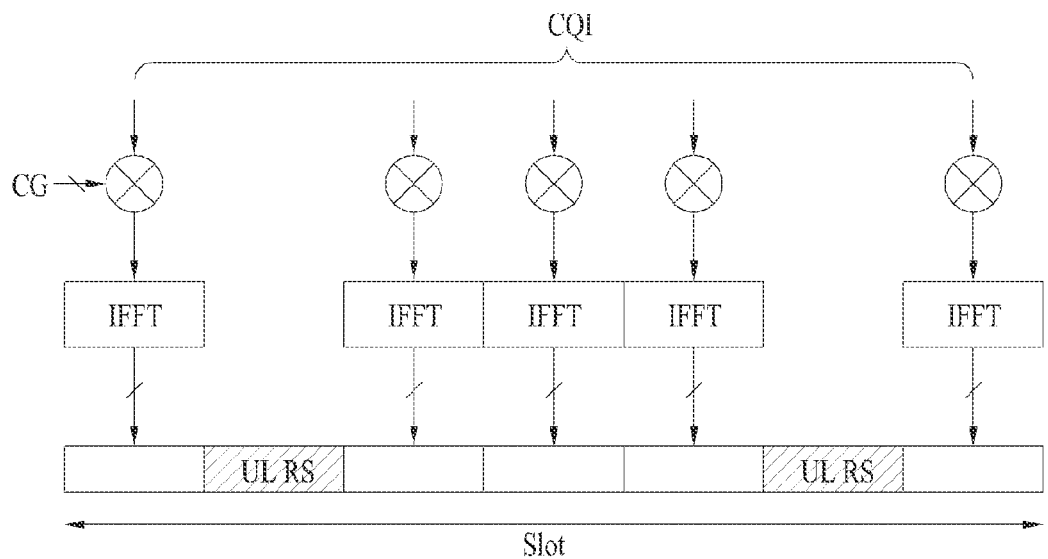
FIGS. 15 and 16 are diagrams showing slot level structures of PUCCH formats 2/2a/2b.
Figure 16:
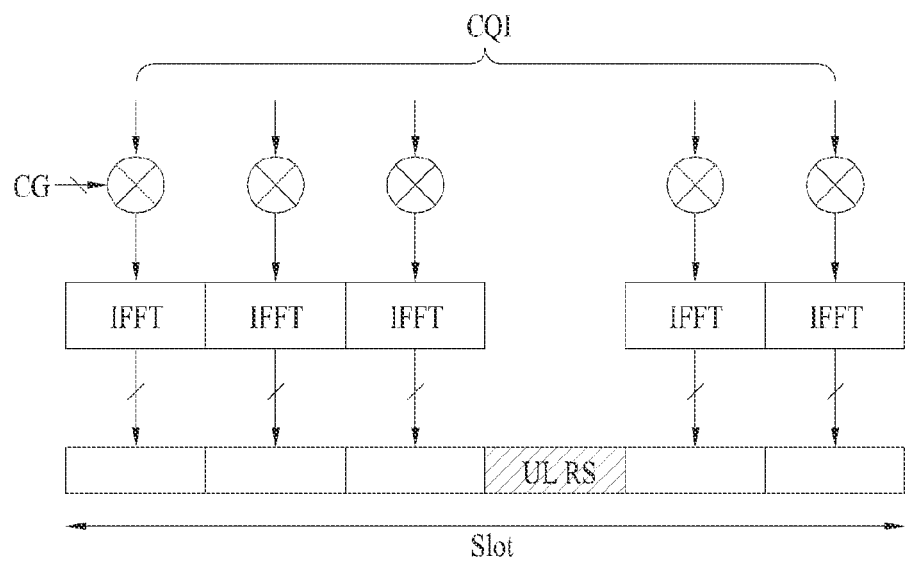

FIG. 15 shows a PUCCH format 2/2a/2b in the normal CP case. FIG. 16 shows a PUCCH format 2/2a/2b in the extended CP case. Referring to FIGS. 15 and 16, one subframe includes 10 QPSK data symbols in addition to an RS symbol in the normal CP case. Each QPSK symbol is spread in a frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in the PUCCH formats 1/1a/1b and 2/2a/2b, a plurality of UEs may be multiplexed by CS+OC+PRB and CS+PRB.

Length-4 and length-3 OCs for PUCCH formats 1/1a/1b are shown in the following Tables 7 and 8.

TABLE 7

| | Length-4 orthogonal sequences for PUCCH formats 1/1a/1b |
| --- | --- |
| Sequence index $n_{oc}$ ($n_s$) | Orthogonal sequences $[w(0) \ldots w(N_{SF}^{PUCCH}-1)]$ |
| 0 | [+1 +1 +1 +1] |
| 1 | [+1 −1 +1 −1] |
| 2 | [+1 −1 −1 +1] |

TABLE 8

| | Length-3 orthogonal sequences for PUCCH formats 1/1a/1b |
| --- | --- |
| Sequence index $n_{oc}$ ($n_s$) | Orthogonal sequences $[w(0) \ldots w(N_{SF}^{PUCCH}-1)]$ |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The OCs for the RS in the PUCCH formats 1/1a/1b is shown in Table 9.

TABLE 9

| | 1a and 1b | |
|---|---|---|
| Sequence index $\bar{n}_{oc}(n_s)$ | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 is a diagram explaining ACK/NACK channelization for the PUCCH formats 1a and 1b. FIG. 17 shows the case of $\Delta_{shift}^{PUCCH}=2$.

Figure 18:
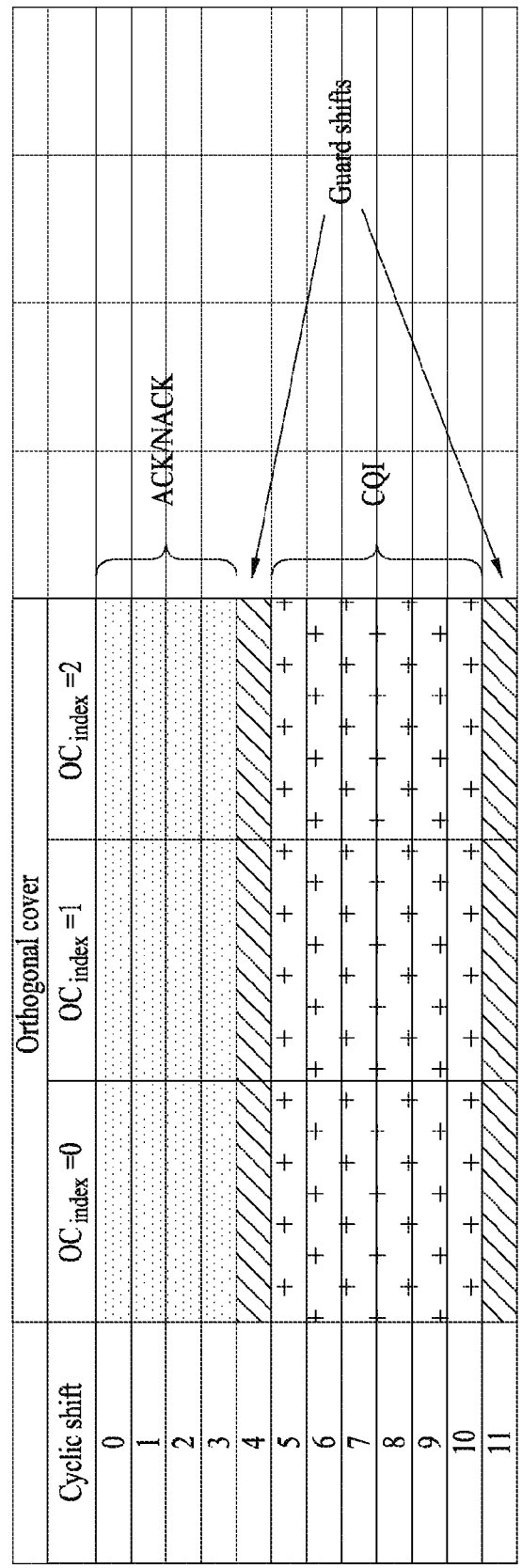
FIG. 18 is a diagram showing channelization of a structure in which PUCCH formats 1/1a/1b and formats 2/2a/2b are mixed within the same PRB.

FIG. 18 is a diagram showing channelization of a structure in which PUCCH formats 1/1a/1b and formats 2/2a/2b are mixed within the same PRB.

CS hopping and OC remapping may be applied as follows.
(1) Symbol-based cell-specific CS hopping for inter-cell interference randomization
(2) Slot level CS/OC remapping
  1) for inter-cell interference randomization
  2) slot-based access for mapping between ACK/NACK channels and resources k Resource $n_r$ for the PUCCH format 1/1a/1b includes the following combination.
(1) CS (=DFT OC in a symbol level) ($n_{cs}$)
(2) OC (OC in a slot level) ($n_{oc}$)
(3) frequency RB ($n_{rb}$)

When indexes representing the CS, the OC and the RB are respectively $n_{cs}$, $n_{oc}$ and $n_{rb}$, a representative index $n_r$ includes $n_{cs}$, $n_{oc}$ and $n_{rb}$. $n_r$ satisfies $n_r=(n_{cs}, n_{oc}, n_{rb})$.

A CQI, a PMI, a RI, and a combination of a CQI and ACK/NACK may be transmitted through the PUCCH formats 2/2a/2b. Reed Muller (RM) channel coding may be applied.

For example, in an LTE system, channel coding for a UL CQI is described as follows. A bit stream $a_0, a_1, a_2, a_3, \ldots, a_{A-1}$ is channel-coded using a (20, A) RM code. Table 10 shows a base sequence for the (20, A) code. $a_0$ and $a_{A-1}$ represent a Most Significant Bit (MSB) and a Least Significant Bit (LSB), respectively. In the extended CP case, a maximum information bit number is 11 except for the case where the CQI and the ACK/NACK are simultaneously transmitted. After the bit stream is coded to 20 bits using the RM code, QPSK modulation may be applied. Before QPSK modulation, coded bits may be scrambled.

Channel coded bits $b_0, b_1, b_2, b_3, \ldots, b_{B-1}$ may be generated by Equation 9.

$$b_i = \sum_{n=0}^{A-1} (a_n \cdot M_{i,n}) \bmod 2 \qquad \text{Equation 9}$$

where, $i=0, 1, 2, \ldots, B-1$ is satisfied.

Table 11 shows an uplink control information (UCI) field for wideband report (single antenna port, transmit diversity or open loop spatial multiplexing PDSCH) CQI feedback.

TABLE 11

| Field | bandwidth |
|---|---|
| Wideband CQI | 4 |

Table 12 shows a UCI field for wideband CQI and PMI feedback. The field reports closed loop spatial multiplexing PDSCH transmission.

TABLE 12

| | Bandwidth | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 13 shows a UCI field for RI feedback for wideband report.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 1 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

TABLE 13

| Field | Bit widths | | |
| --- | --- | --- | --- |
| | | 4 antenna ports | |
| | 2 antenna ports | Maximum of two layers | Maximum of four layers |
| RI (Rank Indication) | 1 | 1 | 2 |

Figure 19:
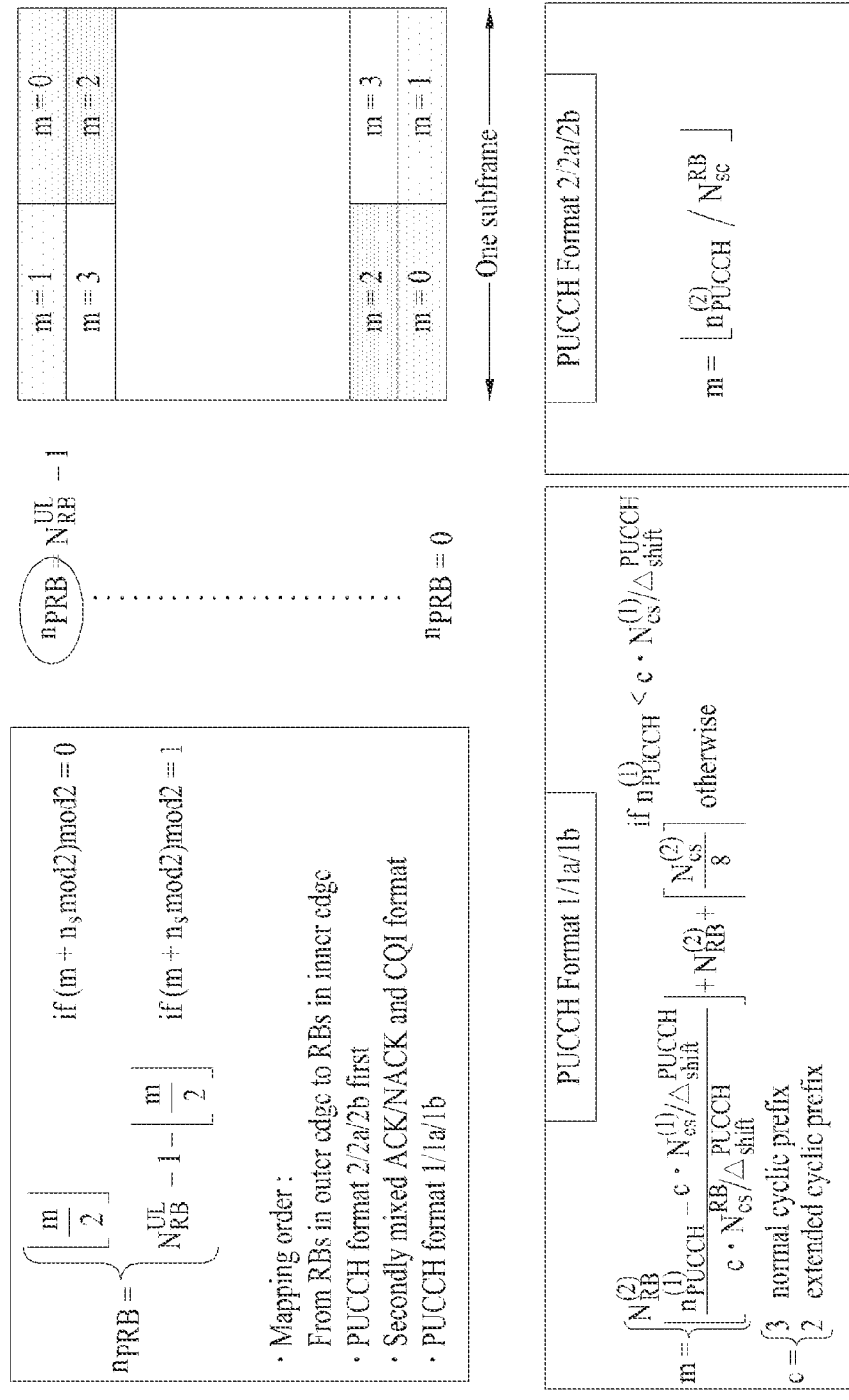
FIG. 19 is a diagram showing allocation of a PRB used to transmit a PUCCH.

FIG. 19 shows PRB allocation. As shown in FIG. 19, the PRB may be used for PUCCH transmission in a slot $n_s$.

A multi-carrier system or a carrier aggregation system refers to a system for aggregating and utilizing a plurality of carriers having a bandwidth smaller than a target bandwidth, for wideband support. When a plurality of carriers having a bandwidth smaller than a target bandwidth is aggregated, the bandwidth of the aggregated carriers may be limited to a bandwidth used in the existing system, for backward compatibility with the existing system. For example, the existing LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, regardless of the bandwidths used in the existing system, a new bandwidth may be defined so as to support CA. Multi-carrier may be used interchangeable with CA and bandwidth aggregation. CA includes contiguous CA and non-contiguous CA.

Figure 20:
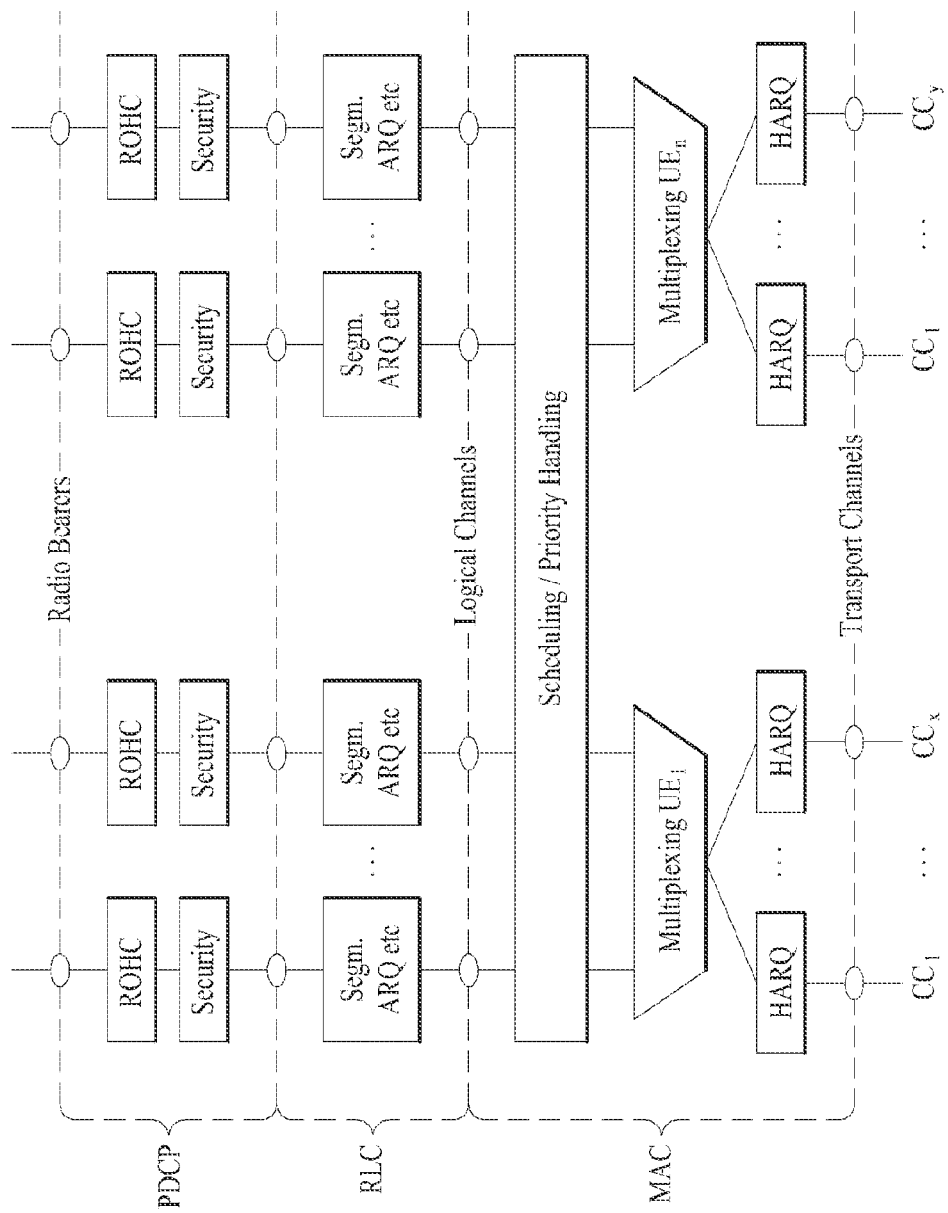
FIG. 20 is a conceptual diagram of management of a downlink component carrier in a base station (BS).
Figure 21:
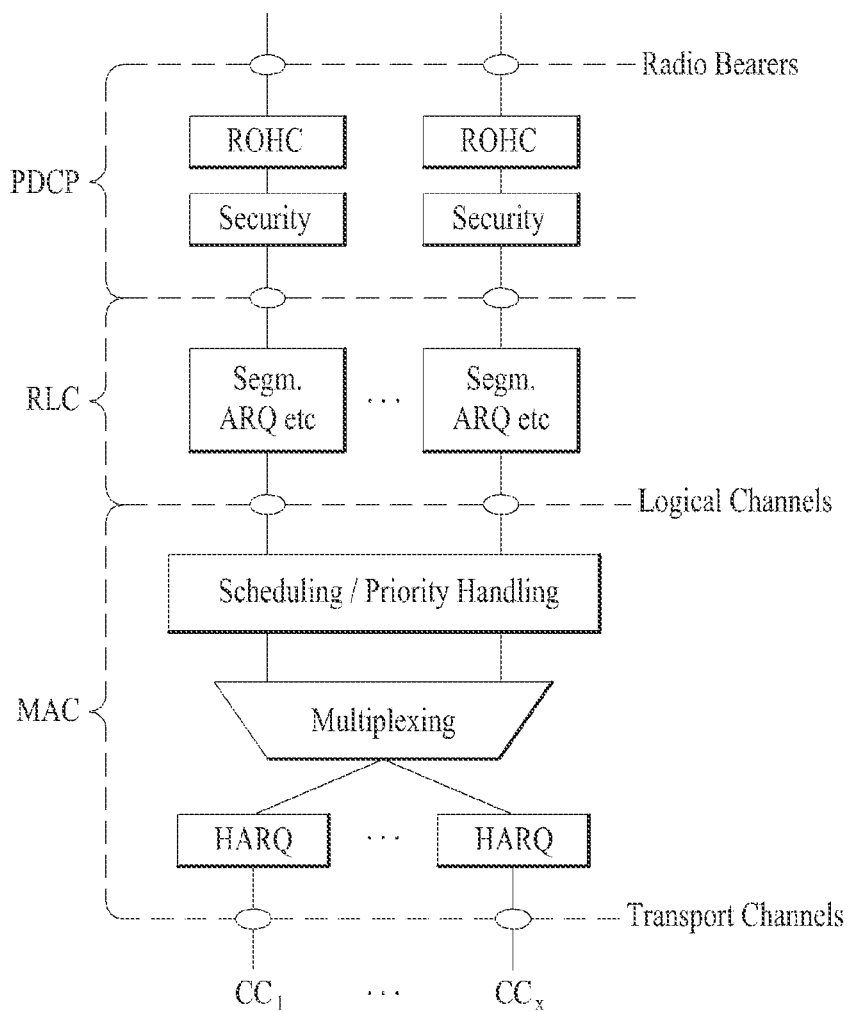
FIG. 21 is a conceptual diagram of management of an uplink component carrier in a user equipment (UE).

FIG. 20 is a conceptual diagram of management of a downlink component carrier in a BS, and FIG. 21 is a conceptual diagram of management of an uplink component carrier in a UE. For convenience of description, it is assumed that a higher layer is a MAC layer in FIGS. 20 and 21.

Figure 22:
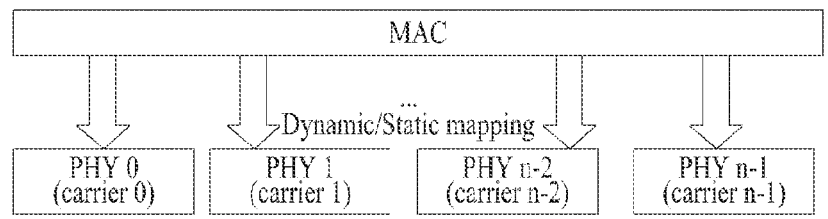
FIG. 22 is a conceptual diagram of the case where one MAC layer manages multiple carriers in a BS.
Figure 23:
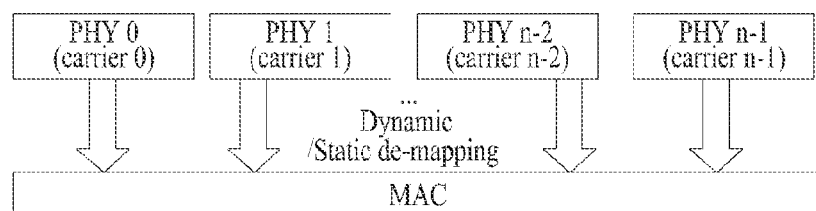
FIG. 23 is a conceptual diagram of the case where one MAC layer manages multiple carriers in a UE.

FIG. 22 is a conceptual diagram of the case where one MAC layer manages multiple carriers in a BS. FIG. 23 is a conceptual diagram of the case where one MAC layer manages multiple carriers in a UE.

Referring to FIGS. 22 and 23, one MAC layer manages one or more frequency carriers so as to perform transmission and reception. Since frequency carriers managed by one MAC layer do not need to be contiguous to each other, resource management is flexible. In FIGS. 22 and 23, one physical (PHY) layer means one component carrier, for convenience. One PHY layer does not necessarily mean an independent radio frequency (RF) device. In general, one independent RF device means one PHY layer, but the present invention is not limited thereto. One RF device may include several PHY layers.

Figure 24:
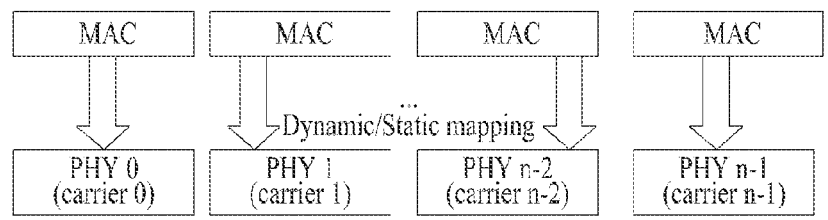
FIG. 24 is a conceptual diagram of the case where one MAC layer manages multiple carriers in a BS.
Figure 25:
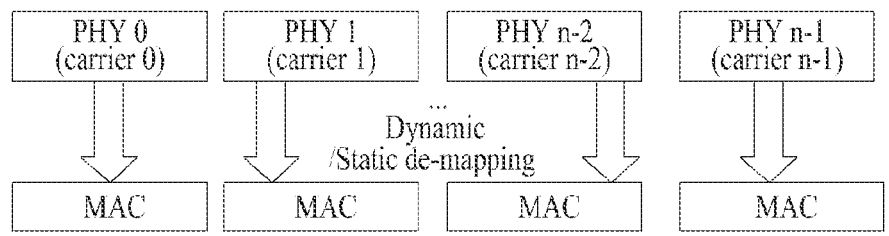
FIG. 25 is a conceptual diagram of the case where a plurality of MAC layers manages multiple carriers in a UE.

FIG. 24 is a conceptual diagram of the case where a plurality of MAC layers manages multiple carriers in a BS. FIG. 25 is a conceptual diagram of the case where a plurality of MAC layers manages multiple carriers in a UE, FIG. 26 is another conceptual diagram of the case where a plurality of MAC layers manages multiple carriers in a BS, and FIG. 27 is another conceptual diagram of the case where a plurality of MAC layers manages multiple carriers in a UE.

In addition to the structures shown in FIGS. 22 and 23, several MAC layers may control several carriers as shown in FIGS. 24 to 27.

Figure 26:
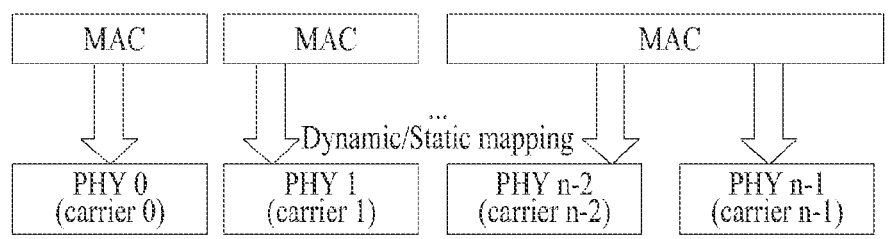
FIG. 26 is a conceptual diagram of the case where a plurality of MAC layers manages multiple carriers in a BS.
Figure 27:
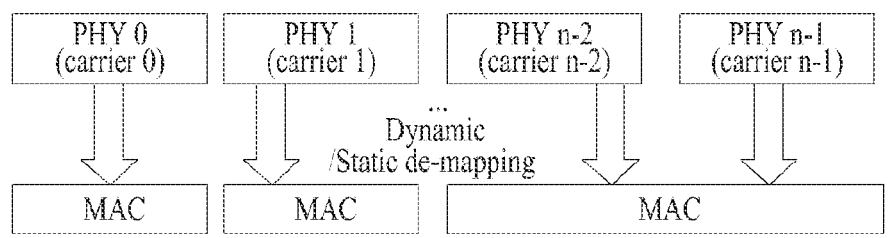
FIG. 27 is a conceptual diagram of the case where one or more MAC layers manage multiple carriers in view of reception of a UE.

Each MAC layer may control each carrier in one-to-one correspondence as shown in FIGS. 24 and 25 and each MAC layer may control each carrier in one-to-one correspondence with respect to some carriers and one MAC layer may control one or more carriers with respect to the remaining carriers as shown in FIGS. 26 and 27.

The system includes a plurality of carriers such as one carrier to N carriers and the carriers may be contiguous or non-contiguous, regardless of UL/DL. A TDD system is configured to manage a plurality (N) of carriers in DL and UL transmission. A FDD system is configured such that a plurality of carriers is used in each of UL and DL. In the case of the FDD system, asymmetric CA in which the number of carriers aggregated in UL and DL and/or the bandwidths of the carriers are different may be supported.

When the numbers of aggregated component carriers in UL and DL are the same, it is possible to configure all component carriers so as to enable backward compatibility with the existing system. However, component carriers which do not consider compatibility are not excluded from the present invention.

Hereinafter, for convenience of description, it is assumed that, when a PDCCH is transmitted through a DL component carrier #0, a PDSCH corresponding thereto is transmitted through a DL component carrier #0. However, cross-carrier scheduling may be applied and the PDSCH may be transmitted through another DL component carrier. The term "component carrier" may be replaced with other equivalent terms (e.g., cell).

Figure 28:
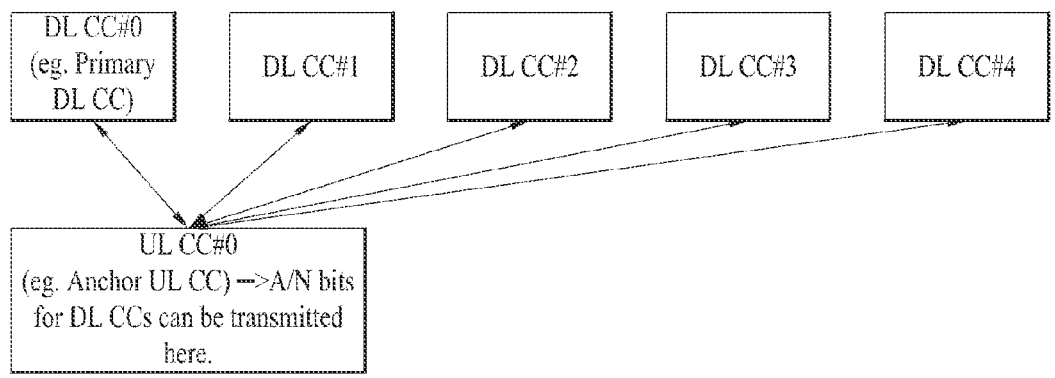
FIG. 28 is a diagram showing asymmetric carrier aggregation (CA) in which a plurality of downlink (DL) component carriers (CCs) and an uplink (UL) CC are linked.

FIG. 28 shows a scenario in which uplink control information (UCI) is transmitted in a wireless communication system supporting CA. For convenience, in the present example, it is assumed that the UCI is ACK/NACK (A/N). The UCI may include control information channel state information (e.g., CQI, PMI, RI, etc.) or scheduling request information (e.g., SR, etc.).

FIG. 28 is a diagram showing asymmetric CA in which five DL CCs and one UL CC are linked. The shown asymmetric CA is set from the viewpoint of UCI transmission. That is, a DL CC-UL CC linkage for UCI and a DL CC-UL CC linkage for data are differently set. For convenience, if it is assumed that one DL CC may transmit a maximum of two codewords, the number of UL ACK/NACK bits is at least two. In this case, in order to transmit ACK/NACK for data received through five DL CCs through one UL CC, ACK/NACK of at least 10 bits is necessary. In order to support a DTX state of each DL CC, at least 12 bits ($=5^5=3125=11.61$ bits) are necessary for ACK/NACK transmission. Since ACK/NACK of at most 2 bits may be transmitted in the existing PUCCH formats 1a/1b, such a structure cannot transmit extended ACK/NACK information. For convenience, although an example in which the amount of UCI information is increased due to CA is described, the amount of UCI information may be increased due to the increase in the number of antennas, existence of a backhaul subframe in a TDD system and a relay system, etc. Similarly to ACK/NACK, when control information associated with a plurality of DL CCs is transmitted through one UL CC, the amount of control information to be transmitted is increased. For example, in the case where a CQI for a plurality of DL CCs must be transmitted through a UL anchor (or primary) CC, CQI payload may be increased.

A DL primary CC may be defined to a DL CC linked with a UL primary CC. Linkage includes implicit and explicit linkage. In the LTE, one DL CC and one UL CC are inherently paired. For example, by LTE pairing, a DL CC linked with a UL primary CC may be referred to as a DL primary CC. This may be regarded as implicit linkage. Explicit linkage indicates that a network configures linkage in advance and may be signaled by RRC, etc. In explicit linkage, a DL CC paired with a UL primary CC may be referred to as a primary DL CC. A UL primary (or anchor) CC may be a UL CC in which a PUCCH is transmitted. Alternatively, the UL primary CC may be a UL CC in which UCI is transmitted through a PUCCH or a PUSCH. A DL primary CC may be configured through high layer signaling. A DL primary CC may be a DL CC in which a UE performs initial access. DL CCs excluding the DL primary CC may be referred to as DL secondary CCs. Similarly, UL CCs excluding a UL primary CC may be referred to as UL secondary CCs.

The LTE-A uses the concept of a cell in order to manage radio resources. The cell is defined as a combination of downlink resources and uplink resources and uplink resources are not indispensable components. Accordingly, the cell may be composed of downlink resources alone or a combination of downlink resources and uplink resources. If CA is supported, a linkage between a downlink resource carrier frequency (or DL CC) and an uplink resource carrier frequency (or UL CC) may be indicated by system information. A cell which operates on a primary frequency (or a PCC) is referred to as a primary cell (PCell) and a cell which operates on a secondary frequency (or an SCC) is referred to as a secondary cell (SCell). A DL CC and a UL CC may be referred to as a DL cell and a UL cell, respectively. In addition, an anchor (or primary) DL CC and an anchor (or primary) UL CC may be referred to as a DL PCell and a UL PCell, respectively. The PCell is used to perform an initial connection establishment process or a connection re-establishment process by a UE. The PCell may indicate a cell indicated in a handover process. The SCell may be configured after RRC connection establishment is performed and may be used to provide additional radio resources. The PCell and the SCell may be collectively called a serving cell. Accordingly, in case of a UE which is in an RRC_CONNECTED state but is not configured with CA or does not support CA, only one serving cell including only a PCell exists. In contrast, in case of a UE which is in an RRC_CONNECTED state and configured with CA, one or more serving cells exist and each serving cell includes a PCell and all SCells. For CA, a network may configure one or more SCells may be configured for a UE supporting CA after starting an initial security activation process, in addition to a PCell which is initially configured in a connection establishment process.

DL-UL pairing may be defined only in FDD. Since TDD uses the same frequency, DL-UL pairing may not be defined. DL-UL linkage may be determined from UL linkage through UL E-UTRA Absolute Radio Frequency Channel Number (EARFCN) information of SIB2. For example, DL-UL linkage may be acquired through SIB2 decoding during initial access and, otherwise, may be acquired through RRC signaling. Accordingly, only SIB2 linkage may be present, but other DL-UL pairing may not be explicitly defined. For example, in the 5DL:1UL structure of FIG. 28, DL CC#0 and UL CC#0 have an SIB2 linkage relationship and the remaining DL CCs may have a relationship with other UL CCs which are not configured for the UE.

In order to support a scenario such as FIG. 28, new scheme is necessary. Hereinafter, a PUCCH format for feedback of UCI (e.g., multiple A/N bits) in a communication system supporting a carrier aggregation is referred to a CA PUCCH format (or PUCCH format 3). For example, PUCCH format 3 is used to transmit A/N information (possibly, including DTX state) corresponding PDSCH (or PDCCH) received on multiple DL serving cells.

FIGS. 29A to 29F show the structure of PUCCH format 3 and a signal processing procedure therefore according to the present embodiment.

FIG. 29A shows the case where the PUCCH format according to the present embodiment is applied to the structure of the PUCCH format 1 (normal CP). Referring to FIG. 29A, a channel coding block channel-codes information bits $a\_0, a\_1, \ldots,$ and $a\_M-1$ (e.g., multiple ACK/NACK bits) and generates encoded bits (coded bits or coding bits) (or codewords) $b\_0, b\_1, \ldots,$ and $b\_N-1$. M denotes the size of the information bits and N denotes the size of the encoded bits. The information bits include UCI, for example, multiple ACK/NACK bits for a plurality of data (or PDSCHs) received through a plurality of DL CCs. The information bits $a\_0, a\_1, \ldots,$ and $a\_M-1$ are joint-coded regardless of the kind/number/size of UCI configuring the information bits. For example, if the information bits include multiple ACK/NACK bits for a plurality of DL CCs, channel coding is performed not with respect to each DL CC or each ACK/NACK bit, but with respect to entire bit information. Thus, a single codeword is generated. Channel coding includes but not limited to simplex repetition, simplex coding, Reed Muller (RM) coding, punctured RM coding, tail-biting convolutional coding (TBCC), low-density parity-check (LDPC) and turbo-coding. Although not shown, the encoded bits can be rate-matched in consideration of a modulation order and the amount of resources. The rate-matching function may be included in the channel coding block or may be performed using a separate functional block. For example, the channel coding block may perform (32, 0) RM coding with respect to a plurality of control information so as to obtain a single codeword and perform circular buffer rate-matching.

A modulator modulates the encoded bits $b\_0, b\_1, \ldots,$ and $b\_N-1$ and generates modulation symbols $c\_0, c\_1, \ldots,$ and $c\_L-1$. L denotes the size of the modulation symbols. The modulation method is performed by changing the amplitude and phase of the transmitted signal. The modulation method includes, for example, n-phase shift keying (PSK) and n-quadrature amplitude modulation (QAM) (n is an integer greater than or equal to 2). More specifically, the modulation method may include binary PSK (BPSK), quadrature PSK (QPSK), 8-PSK, QAM, 16-QAM, 64-QAM, etc.

A divider divides the modulation symbols $c\_0, c\_1, \ldots,$ and $c\_L-1$ into slots. The order/pattern/method of dividing the modulation symbols to slots is not specially limited. For example, the divider may divide the modulation symbols to slots sequentially from the head (local type). In this case, as shown, the modulation symbols $c\_0, c\_1, \ldots,$ and $c\_L/2-1$ may be divided to a slot 0 and the modulation symbols $c\_L/2, c\_L/2+1, \ldots,$ and $c\_L-1$ may be divided to a slot 1. The modulation symbols may be interleaved (or permutated) when being divided to the slots. For example, even-numbered modulation symbols may be divided to the slot 0 and odd-numbered modulation symbols may be divided to the slot 1. The order of the modulation process and the division process may be changed. Instead of dividing different coding bits into slots, the same coding bits may be configured to be repeated in slot units. In this case, the divider may be omitted.

A DFT precoder performs DFT precoding (e.g., 12-point DFT) with respect to the modulation symbols divided to the slots, in order to generate a single carrier waveform. Referring to the drawing, the modulation symbols $c\_0, c\_1, \ldots,$ and $c\_L/2-1$ divided to the slot 0 are DFT-precoded to DFT symbols $d\_0, d\_1, \ldots,$ and $d\_L/2-1$, and the modulation symbols $c\_L/2, c\_L/2+1, \ldots,$ and $c\_L-1$ divided to the slot 1 are DFT-precoded to DFT symbols $d\_L/2, d\_L/2+1, \ldots,$ and $d\_L-1$. DFT precoding may be replaced with another linear operation (e.g., Walsh precoding). The DFT precoder may be replaced with a CAZAC modulator. The CAZAC modulator modulates the modulation symbols $c\_0, c\_1, \ldots,$ and $c\_L/2-1$ and $c\_L/2, c\_L/2+1, \ldots,$ and $c\_L-1$ divided to the slots with corresponding sequences and generate CAZAC modulation symbols $d\_0, d\_1, \ldots, d\_l/2-1$ and $d\_L/2, d\_L/2+1, \ldots,$ and $d\_L-1$. The CAZAC modulator includes, for example, CAZAC sequences or sequences for LTE computer generated (CG) 1RB. For example, if the LTE CG sequences are $r\_0, \ldots$, and $r\_L/2-1$, the CAZAC modulation symbols may be $d\_n=c\_n*r\_n$ or $d\_n=\text{conj}(c\_n)*r\_n$.

A spreading block spreads a signal subjected to DFT at an SC-FDMA symbol level (time domain). Time domain spreading of the SC-FDMA symbol level is performed using a spreading code (sequence). The spreading code includes a quasi-orthogonal code and an orthogonal code. The quasi-orthogonal code includes, but is not limited to, a pseudo noise (PN) code. The orthogonal code includes, but is not limited to, a Walsh code and a DFT code. Although the orthogonal code is described as a representative example of the spreading code for ease of description in the present specification, the orthogonal code is only exemplary and may be replaced with a quasi-orthogonal code. A maximum value of a spreading code size (or a spreading factor (SF)) is restricted by the number of SC-FDMA symbols used to transmit control information. For example, in the case where four SC-FDMA symbols are used to transmit control information in one slot, (quasi-)orthogonal codes w0, w1, w2 and w3 having a length of 4 may be used in each slot. The SF means the spreading degree of the control information and may be associated with the multiplexing order of a UE or the multiplexing order of an antenna. The SF may be changed to 1, 2, 3, 4, ... according to requirements of the system and may be defined between a BS and a UE in advance or may be informed to the UE through DCI or RRC signaling. For example, in the case where one of SC-FDMA symbols for control information is punctured in order to transmit an SRS, a spreading code with a reduced SF (e.g., SF=3 instead of SF=4) may be applied to the control information of the slot.

The signal generated through the above procedure is mapped to subcarriers in a PRB, is subjected to IFFT, and is transformed into a time domain signal. The time domain signal is attached with CP and the generated SC-FDMA symbols are transmitted through a RF stage.

On the assumption that ACK/NACK for five DL CCs is transmitted, each procedure will be described in detail. In the case where each DL CC may transmit two PDSCHs, the number ACK/NACK bits may be 12 if a DTX state is included. In consideration of QPSK modulation and SF=4 time spreading, a coding block size (after rate-matching) may be 48 bits. The encoded bits may be modulated into 24 QPSK symbols and 12 symbols of the generated QPSK symbols are divided to each slot. In each slot, 12 QPSK symbols are converted into 12 DFT symbols by a 12-point DFT operation. In each slot, 12 DFT symbols are spread to four SC-FDMA symbols using the spreading code having SF=4 in a time domain and are mapped. Since 12 bits are transmitted through [2 bits*12 subcarriers+8 SC-FDMA symbols], the coding rate is 0.0625 (=12/192). In case of SF=4, a maximum of four UEs may be multiplexed per 1PRB.

Figure 29B:
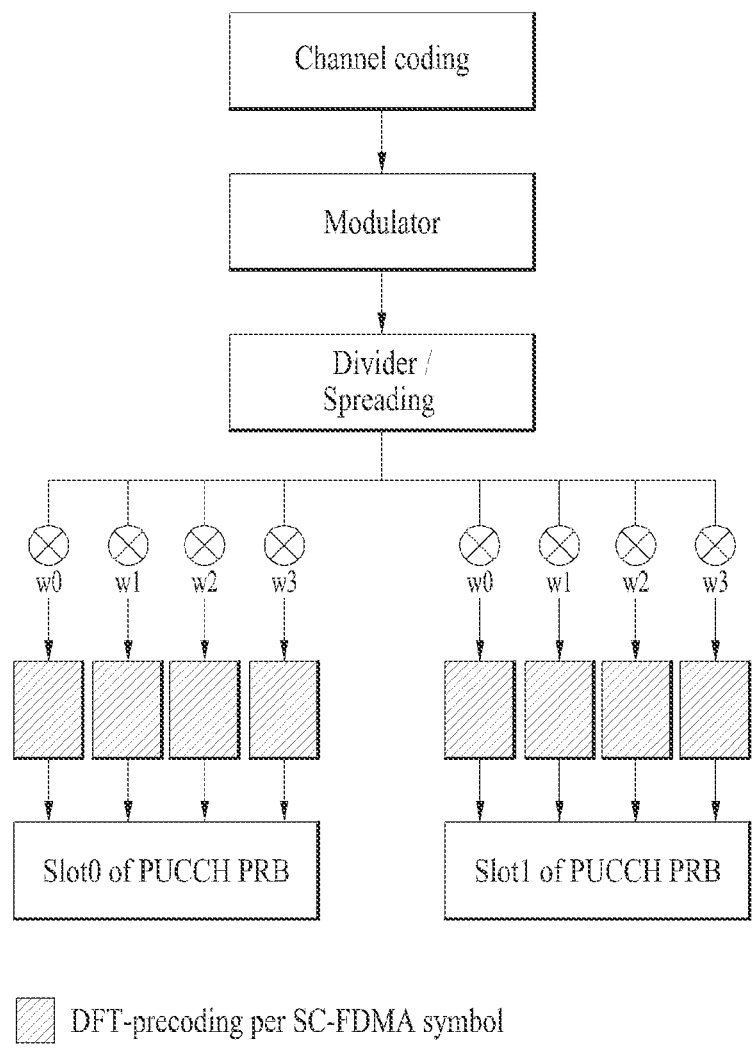

The signal processing procedure described with reference to FIG. 29A is only exemplary and the signal mapped to the PRB in FIG. 29A may be obtained using various equivalent signal processing procedures. The signal processing procedures equivalent to FIG. 29A will be described with reference to FIGS. 29B to 29F.

FIG. 29B is different from FIG. 29A in the order of the DFT precoder and the spreading block. In FIG. 29A, since the function of the spreading block is equal to multiplication of a DFT symbol sequence output from the DFT precoder by a specific constant at an SC-FDMA symbol level, the value of the signal mapped to the SC-FDMA symbols is identical even when the order of the DFT precoder and the spreading block is changed. Accordingly, the signal processing procedure for the PUCCH format 3 may be performed in order of channel coding, modulation, division, spreading and DFT precoding. In this case, the division process and the spreading process may be performed by one functional block. For example, the modulation symbols may be spread at the SC-FDMA symbol level while being alternately divided to slots. As another example, the modulation symbols are copied to suit the size of the spreading code when the modulation symbols are divided to slots, and the modulation symbols and the elements of the spreading code may be multiplied in one-to-one correspondence. Accordingly, the modulation symbol sequence generated in each slot is spread to a plurality of SC-FDMA symbols at the SC-FDMA symbol level. Thereafter, the complex symbol sequence corresponding to each SC-FDMA symbol is DFT-precoded in SC-FDMA symbol units.

Figure 29C:
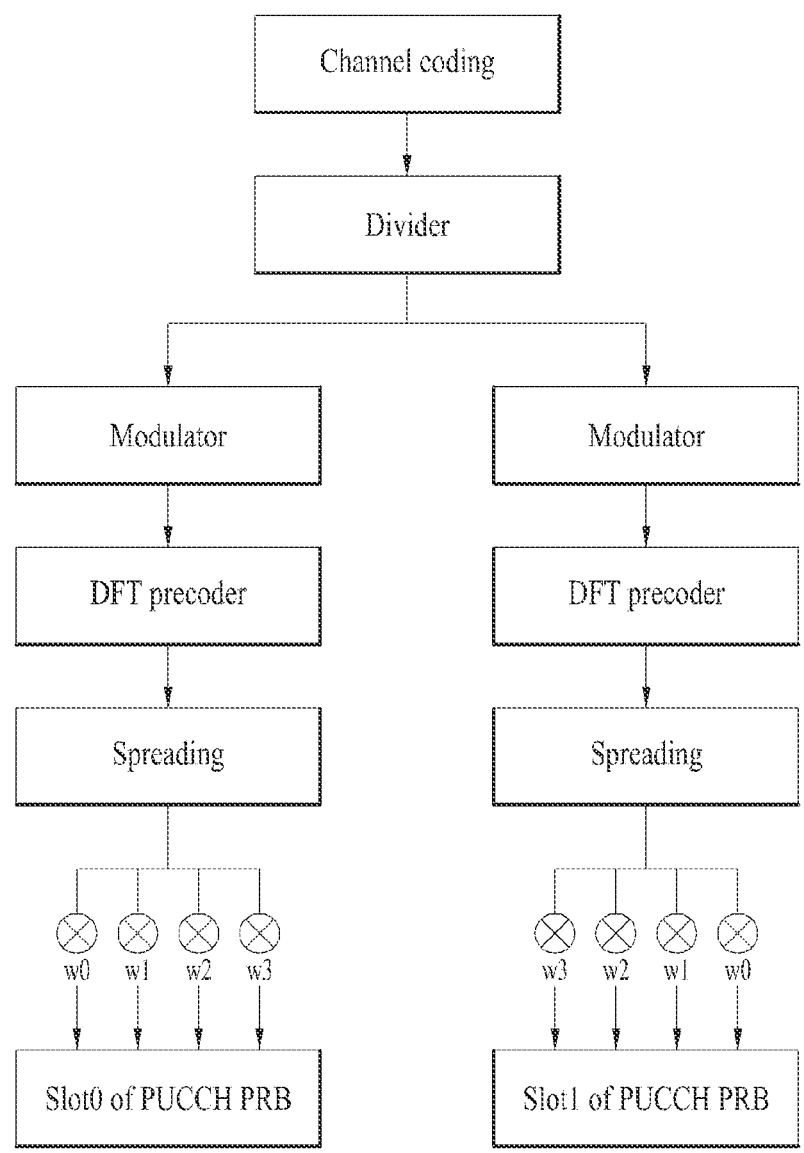

FIG. 29C is different from FIG. 29A in the order of the modulator and the divider. Accordingly, the signal processing procedure for the PUCCH format 3 may be performed in order of joint channel coding and division at a subframe level and modulation, DFT precoding and spreading at each slot level.

Figure 29D:
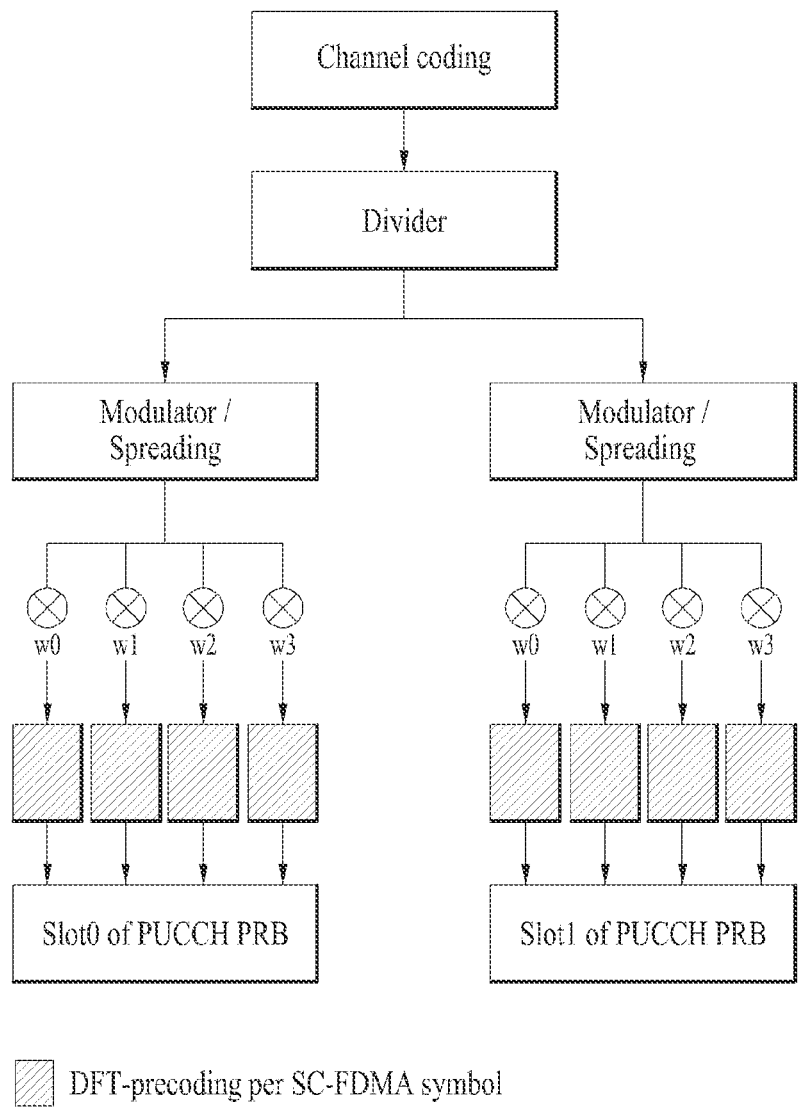

FIG. 29D is different from FIG. 29C in order of the DFT precoder and the spreading block. As described above, since the function of the spreading block is equal to multiplication of a DFT symbol sequence output from the DFT precoder by a specific constant at an SC-FDMA symbol level, the value of the signal mapped to the SC-FDMA symbols is identical even when the order of the DFT precoder and the spreading block is changed. Accordingly, the signal processing procedure for the PUCCH format 3 may be performed by joint channel coding and division at a subframe level and modulation at each slot level. The modulation symbol sequence generated in each slot is spread to a plurality of SC-FDMA symbols at the SC-FDMA symbol level and the modulation symbol sequence corresponding to each SC-FDMA symbol is DFT-precoded in SC-FDMA symbol units. In this case, the modulation process and the spreading process may be performed by one functional block. For example, the generated modulation symbols may be directly spread at the SC-FDMA symbol level while the encoded bits are modulated. As another example, the modulation symbols are copied to suit the size of the spreading code when the encoded bits are modulated, and the modulation symbols and the elements of the spreading code may be multiplied in one-to-one correspondence.

Figure 29E:
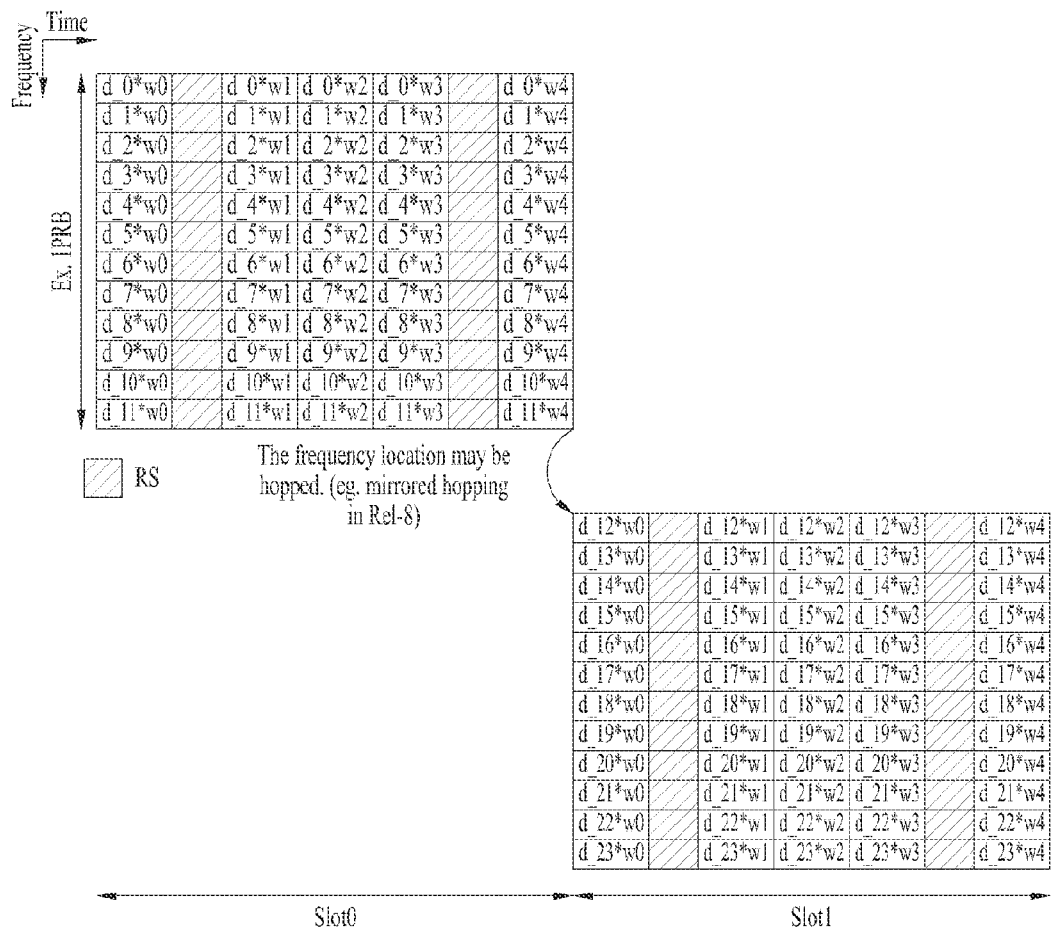
Figure 29F:
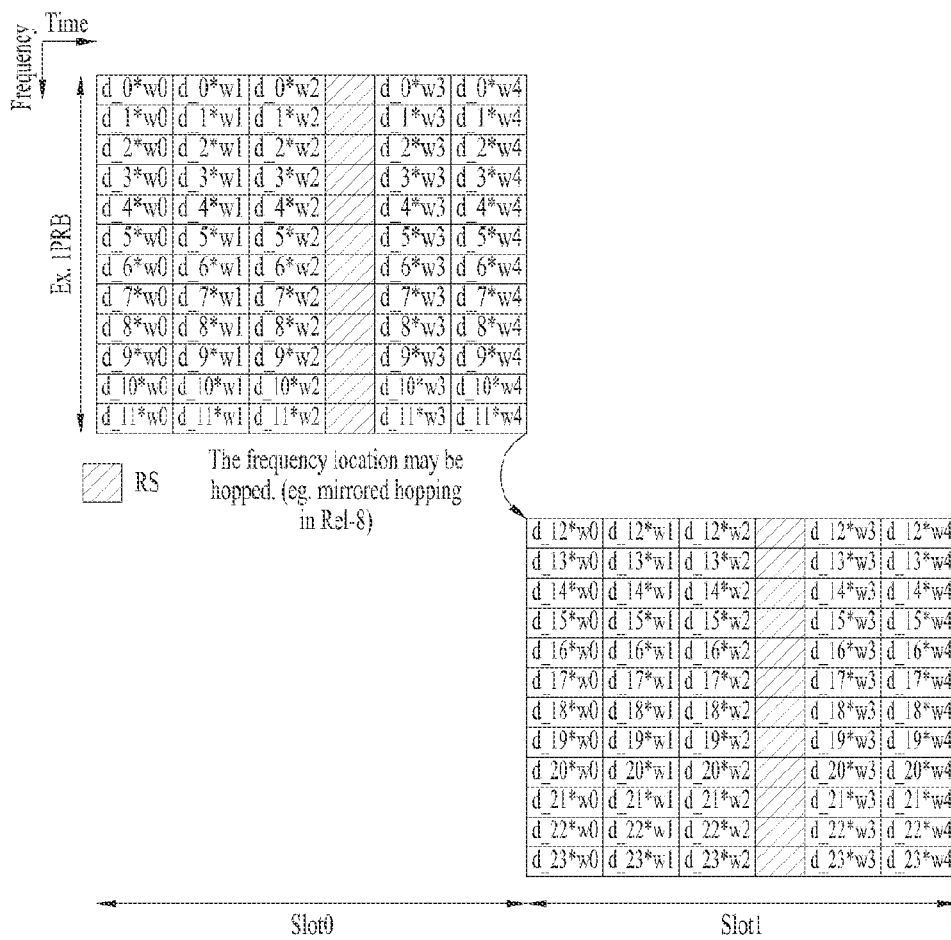

FIG. 29E shows the case where the PUCCH format 3 according to the present embodiment is applied to the structure of the PUCCH format 2 (normal CP) and FIG. 29F shows the case where the PUCCH format 3 according to the present embodiment is applied to the structure of the PUCCH format 2 (extended CP). The basic signal processing procedure is equal to those described with respect to FIGS. 29A to 29D. As the structure of the PUCCH format 2 of the existing LTE is reused, the number/locations of UCI SC-FDMA symbols and RS SC-FDMA symbols in the PUCCH format 3 is different from that of FIG. 29A.

Table 14 shows the location of the RS SC-FDMA symbol in the PUCCH format 3. It is assumed that the number of SC-FDMA symbols in a slot is 7 (indexes 0 to 6) in the normal CP case and the number of SC-FDMA symbols in a slot is 6 (indexes 0 to 5) in the extended CP case.

TABLE 14

| | SC-FDMA symbol location of RS | | |
|---|---|---|---|
| | Normal CP | Extended CP | Note |
| PUCCH format 3 | 2, 3, 4 | 2, 3 | PUCCH format 1 is reused |
| | 1, 5 | 3 | PUCCH format 2 is reused |

Here, the RS may reuse the structure of the existing LTE. For example, an RS sequence may be defined using cyclic shift of a base sequence (see Equation 1).

A multiplexing capacity of a UCI data part is 5 due to SF=5. A multiplexing capacity of an RS part is determined according to a cyclic shift interval $\Delta_{shift}^{PUCCH}$. More specifically, the multiplexing capacity of the RS part is $$\frac{12}{\Delta_{shift}^{PUCCH}}.$$

For example, multiplexing capacities are 12, 6 and 4 in case of $\Delta_{shift}^{PUCCH}=1$, $\Delta_{shift}^{PUCCH}=2$ and $\Delta_{shift}^{PUCCH}=3$, respectively. In FIGS. 29E to 29F, the multiplexing capacity of the UCI data part is 5 due to SF=5 and the multiplexing capacity of the RS part is 4 in case of $\Delta_{shift}^{PUCCH}=3$. Thus, the total multiplexing capacity is set to 4 which is the smaller capacity of the two multiplexing capacities.

FIG. 30 shows the structure of PUCCH format 3 with an increased multiplexing capacity. Referring to FIG. 30, SC-FDMA symbol level spreading is applied to the RS part in a slot. Thus, the multiplexing capacity of the RS part doubles. That is, even in case of $\Delta_{shift}^{PUCCH}=3$, the multiplexing capacity of the RS part becomes 8 and the multiplexing capacity of the UCI data part is not lost. The orthogonal code cover for the RS includes, but is not limited to, a Walsh cover of [y1 y2]=[1 1], [1 −1] or a linearly transformed form (e.g., [j j], [j −j], [1 j], [1 −j], etc.) thereof. y1 is applied to a first RS SC-FDMA symbol in the slot and y2 is applied to a second SC-FDMA symbol in the slot.

Figure 31:
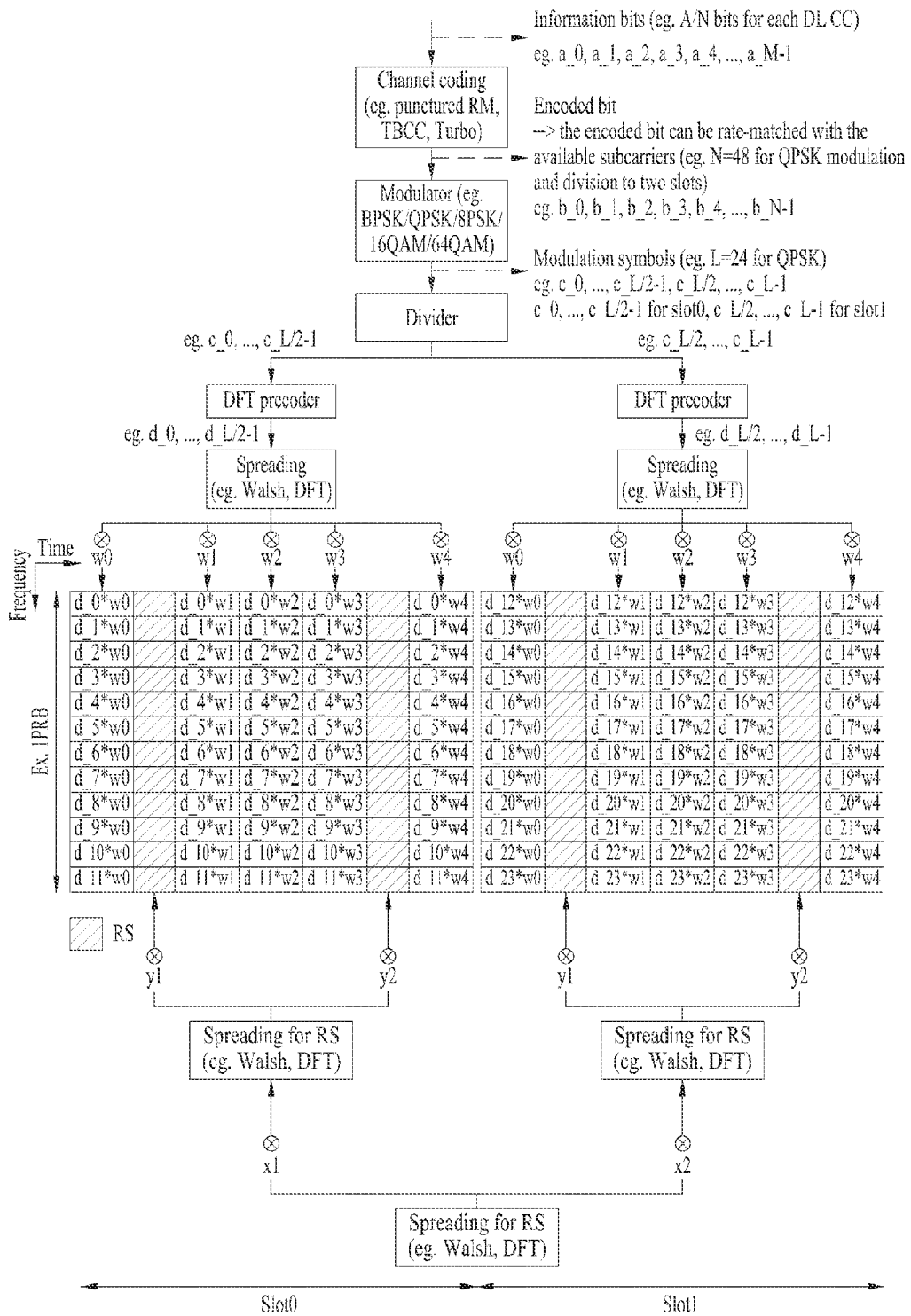

FIG. 31 shows the structure of another PUCCH format 3 with an increased multiplexing capacity. If slot-level frequency hopping is not performed, spreading or covering (e.g., Walsh covering) may be additionally performed in slot units so as to double the multiplexing capacity. In the case where slot-level frequency hopping is performed, if Walsh covering is applied in slot units, orthogonality may be broken due to a difference between channel conditions of slots. The slot unit spreading code (e.g., orthogonal code cover) for the RS includes, but is not limited to, a Walsh cover of [x1 x2]=[1 1], [1 −1] or a linearly transformed form (e.g., [j j], [j −j], [1 j], [1 −j], etc.) thereof. x1 is applied to a first slot and x2 is applied to a second slot. Although the case where slot-level spreading (or covering) is performed and spreading (or covering) is then performed at an SC-FDMA symbol level is shown in the drawing, the order may be changed.

A signal processing procedure of PUCCH format 3 will be described using equations. For convenience, it is assumed that a length-5 OCC is used (e.g., FIGS. 29E to 31).

First, a bit block $b(0), \ldots, b(M_{bit}-1)$ is scrambled with a UE-specific scrambling sequence. The bit block $b(0), \ldots, b(M_{bit}-1)$ may correspond to coded bits $b\_0, b\_1, \ldots, b\_N-1$ of FIG. 29A. The bit block $b(0), \ldots, b(M_{bit}-1)$ may include at least one of an ACK/NACK bit, a CSI bit and an SR bit. The scrambled bit block $\tilde{b}(0), \ldots, \tilde{b}(M_{bit}-1)$ may be generated by the following equation.

$$\tilde{b}(i)=(b(i)+c(i)) \bmod 2 \qquad \text{Equation 10}$$

where, c(i) denotes a scrambling sequence. c(i) includes a pseudo-random sequence defined by a length-31 gold sequence and may be generated by the following equation. mod denotes a modulo operation.

$$c(n)=(x_1(n+N_C)+x_2(n+N_C)) \bmod 2 \; x_1(n+31)=(x_1(n+3)+x_1(n)) \bmod 2 \; x_2(n+31)=(x_2(n+3)+x_2(n+2)+x_2(n+1)+x_2(n)) \bmod 2 \qquad \text{Equation 11}$$

where, $N_C=1600$. A first m-sequence is initialized to $x_1(0)=1, x_1(n)=0, n=1, 2, \ldots, 30$. A second m-sequence is initialized to $$c_{init} = \sum_{i=0}^{30} x_2(i) \cdot 2^i.$$

$c_{init}$ may be initialized to $c_{init}=(\lfloor n_s/2 \rfloor+1) \cdot (2N_{ID}^{cell}+1) \cdot 2^{16}+n_{RNTI}$ whenever a subframe is started. $n_s$ denotes a slot number in a radio frame, $N_{ID}^{cell}$ denotes a physical layer cell identity, and $n_{RNTI}$ denotes a radio network temporary identifier.

The scrambled bit block $\tilde{b}(0), \ldots, \tilde{b}(M_{bit}-1)$ is modulated and a complex modulation symbol block $d(0), \ldots d(M_{symb}-1)$ is generated. When QPSK modulation is performed, $M_{symb}=M_{bit}/2=2N_{sc}^{RB}$. The complex modulation symbol blocks $d(0), \ldots, d(M_{symb}-1)$ correspond to modulation symbols $c\_0, c\_1, c\_N-1$ of FIG. 29A.

The complex modulation symbol blocks $d(0), \ldots, d(M_{symb}-1)$ are block-wise spread using an orthogonal sequence $w_{n_{oc}}(i)$. $N_{SF,0}^{PUCCH}+N_{SF,1}^{PUCCH}$ complex symbol sets are generated by the following equation. A frequency division/spreading process of FIG. 29B is performed by the following equation. Each complex symbol set corresponds to one SC-FDMA symbol and has $N_{sc}^{RB}$ (e.g., 12) complex modulation values.

$$y_n(i) = \qquad \text{Equation 12}$$

$$\begin{cases} w_{n_{oc},0}(\bar{n}) \cdot e^{j\pi \lfloor n_{cs}^{cell}(n_s,l)/64 \rfloor/2} \cdot d(i) & n < N_{SF,0}^{PUCCH} \\ w_{n_{oc},1}(\bar{n}) \cdot e^{j\pi \lfloor n_{cs}^{cell}(n_s,l)/64 \rfloor/2} \cdot d(N_{sc}^{RB}+i) & \text{otherwise} \end{cases}$$

$$\bar{n} = n \bmod N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

where, $N_{SF,0}^{PUCCH}$ and $N_{SF,1}^{PUCCH}$ correspond to the number of SC-FDMA symbols used for PUCCH transmission at slot 0 and slot 1, respectively. In case of using normal PUCCH format 3, $N_{SF,0}^{PUCCH}=N_{SF,1}^{PUCCH}=5$. In case of using shortened PUCCH format 3, $N_{SF,0}^{PUCCH}=5$ and $N_{SF,1}^{PUCCH}=4$. $w_{n_{oc},0}(i)$ and $w_{n_{oc},1}(i)$ respectively indicate orthogonal sequences applied to a slot 0 and a slot 1 and are given by Table 15. $n_{oc}$ denotes an orthogonal sequence index (or an orthogonal code index). $\lfloor \; \rfloor$ denotes a flooring function. $n_{cs}^{cell}(n_s,l)$ may be $$n_{cs}^{cell}(n_s, l) = \sum_{i=0}^{7} c(8N_{symb}^{UL} \cdot n_s + 8l + i) \cdot 2^i.$$

c(i) may be given by Equation 11 and may be initialized to $c_{init}=N_{ID}^{cell}$ at the beginning of every radio frame.

Table 15 shows a sequence index $n_{oc}$ and an orthogonal sequence $w_{n_{oc}}(i)$.

TABLE 15

| Sequence index $n_{oc}$ | Orthogonal sequence $[w_{n_{oc}}(0) \ldots w_{n_{oc}}(N_{SF}^{PUCCH}-1)]$ | |
|---|---|---|
| | $N_{SF}^{PUCCH}=5$ | $N_{SF}^{PUCCH}=4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

In Table 15, $N_{SF}^{PUCCH}=5$ orthogonal sequence (or code) is generated by the following equation.

$$\left[ e^{j\frac{2\pi \cdot 0 \cdot n_{oc}}{5}} \quad e^{j\frac{2\pi \cdot 1 \cdot n_{oc}}{5}} \quad e^{j\frac{2\pi \cdot 2 \cdot n_{oc}}{5}} \quad e^{j\frac{2\pi \cdot 3 \cdot n_{oc}}{5}} \quad e^{j\frac{2\pi \cdot 4 \cdot n_{oc}}{5}} \right] \quad \text{Equation 13}$$

Resources for PUCCH format 3 are identified by a resource index $n_{PUCCH}^{(3)}$. For example, $n_{oc}$ may be $n_{oc}=n_{PUCCH}^{(3)}$ mod $N_{SF,1}^{PUCCH}$. $n_{PUCCH}^{(3)}$ may be indicated through a transmit power control (TPC) field of an SCell PDCCH. More specifically, $n_{oc}$ for each slot may be given by the following equation.

$$n_{oc,0} = n_{PUCCH}^{(3)} \bmod N_{SF,1}^{PUCCH} \quad \text{Equation 14}$$

$$n_{oc,1} = \begin{cases} (3n_{oc,0}) \bmod N_{SF,1}^{PUCCH} & \text{if } N_{SF,1}^{PUCCH} = 5 \\ n_{oc,0} \bmod N_{SF,1}^{PUCCH} & \text{otherwise} \end{cases}$$

where, $n_{oc,0}$ denotes a sequence index value $n_{oc}$ for a slot 0 and $n_{oc,1}$ denotes a sequence index value $n_{oc}$ for slot 1. In case of normal PUCCH format 3, $N_{SF,0}^{PUCCH}=N_{SF,1}^{PUCCH}=5$. In case of shortened PUCCH format 3, $N_{SF,0}^{PUCCH}=5$, $N_{SF,1}^{PUCCH}=4$.

A block-spread complex symbol set may be cyclic-shifted according to the following equation.

$$\tilde{y}_n(i) = y_n((i+n_{cs}^{cell}(n_s,l)) \bmod N_{sc}^{RB}) \quad \text{Equation 15}$$

where, $n_s$ denotes a slot number within a radio frame and l denotes an SC-FDMA symbol number within a slot. $n_{cs}^{cell}(n_s,l)$ is defined by Equation 12. $n=0, \ldots, N_{SF,0}^{PUCCH}+N_{SF,1}^{PUCCH}-1$.

Each cyclic-shifted complex symbol set is transform-precoded according to the following equation. As a result, a complex symbol block $z(0), \ldots, z((N_{SF,0}^{PUCCH}+N_{SF,1}^{PUCCH})N_{sc}^{RB}-1)$ is generated.

$$z(n \cdot N_{sc}^{RB} + k) = \frac{1}{\sqrt{P}} \frac{1}{\sqrt{N_{sc}^{RB}}} \sum_{i=0}^{N_{sc}^{RB}-1} \tilde{y}_n(i) e^{-j\frac{2\pi i k}{N_{sc}^{RB}}} \quad \text{Equation 16}$$

$k = 0, \ldots, N_{sc}^{RB} - 1$ $n = 0, \ldots, N_{SF,0}^{PUCCH} + N_{SF,1}^{PUCCH} - 1$ The complex symbol block $z(0), \ldots, z((N_{SF,0}^{PUCCH}+N_{SF,1}^{PUCCH})N_{sc}^{RB}-1)$ is mapped to physical resources after power control. A PUCCH uses one resource block in each slot of a subframe. In the resource block, $z(0), \ldots, z((N_{SF,0}^{PUCCH}+N_{SF,1}^{PUCCH})N_{sc}^{RB}-1)$ is mapped to a resource element (k,l) on an antenna port p, which is not used for RS transmission (see Table 14). Mapping is performed in ascending order of a first slot of a subframe, k and l. k denotes a subcarrier index and l denotes an SC-FDMA symbol index in a slot.

Next, a UL transmission mode configuration will be described. A transmission mode for a PUCCH may be roughly divided into two modes. One is a single antenna transmission mode and the other is a multi-antenna transmission mode. The single antenna transmission mode refers to a method of transmitting a signal through a single antenna when a UE transmits a PUCCH or a method of enabling a receiver (e.g., a BS) to recognize that a signal is transmitted through a single antenna. In the multi-antenna transmission mode, a UE may use a virtualization scheme (e.g., PVS, antenna selection, CDD, etc.) while transmitting a signal through multiple antennas. The multi-antenna transmission mode indicates that a UE transmits a signal to a BS through multiple antennas using a transmit diversity or MIMO scheme. As a transmit diversity scheme used at this time, a spatial orthogonal resource transmit diversity (SORTD) may be used. In the present specification, for convenience, the multi-antenna transmission mode is referred to as a SORTD mode unless stated otherwise.

Figure 32:
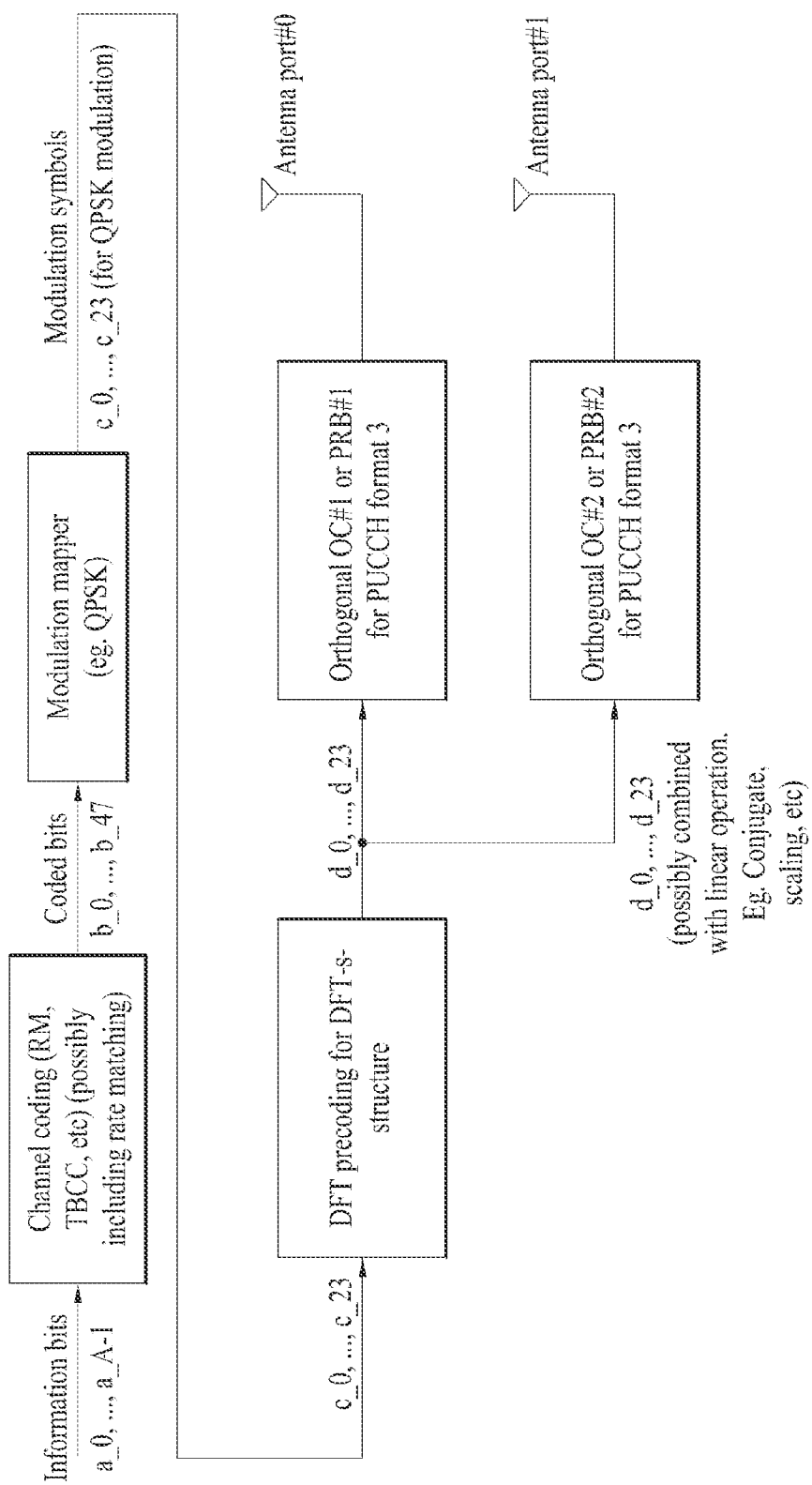
FIG. 32 is a diagram showing a signal processing block/procedure for SORTD.

FIG. 32 shows a signal processing block/procedure for SORTD. The basic procedure excluding the multi-antenna transmission process is equal to that described with reference to FIGS. 29 to 31. Referring to FIG. 32, modulation symbols c_0, . . . , c_23 are DFT-precoded and transmitted through resources (e.g., OC, PRB or a combination thereof) given on a per antenna port basis. In this example, although one DFT operation is performed for a plurality of antenna ports, the DFT operation may be performed on a per antenna port basis. In addition, although the DFT-precoded symbols d_0, . . . , d_23 are transmitted through a second OC/PRB in a state of being duplicated, a modified form (e.g., complex conjugate or scaling) of the DFT-precoded symbols d_0, . . . , d_23 may be transmitted through the second OC/PRB. For example, in order to guarantee orthogonality between PUCCH signals transmitted through different antenna ports, [$OC^{(0)} \neq OC^{(1)}$; $PRB^{(0)}=PRB^{(1)}$], [$OC^{(0)}=OC^{(1)}$; $PRB^{(0)} \neq PRB^{(1)}$] and [$OC^{(0)} \neq OC^{(1)}$; $PRB^{(0)} \neq PRB^{(1)}$] are possible. Here, numbers in superscript denote an antenna port number or a value corresponding thereto.

Figure 33:
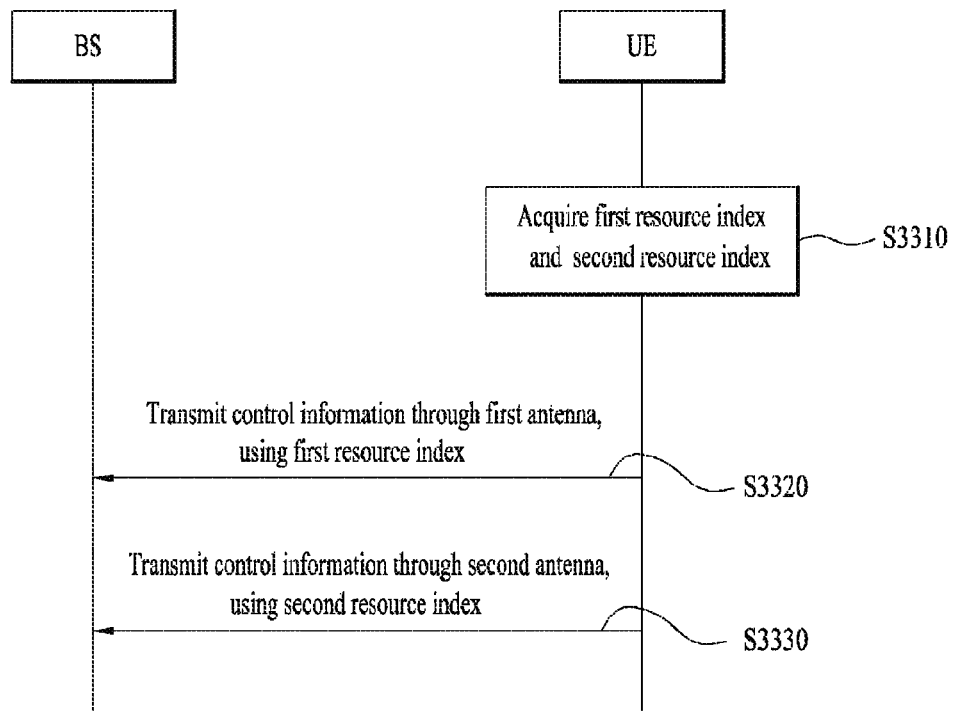
FIG. 33 is a diagram illustrating an SORTD operation.

FIG. 33 is a schematic diagram illustrating a SORTD operation. Referring to FIG. 33, a UE acquires a first resource index and a second resource index (S3310). The resource index (or resource value) indicates a PUCCH resource index (or PUCCH resource value) and preferably a PUCCH format 3 resource index (or PUCCH format 3 resource value). Step S3310 may include a plurality of steps which are sequentially performed. The method of acquiring the first resource index and the second resource index will be described in detail below. Thereafter, the UE transmits a PUCCH signal using PUCCH resources corresponding to the first resource index through a first antenna (port) (S3320). The UE transmits a PUCCH signal using PUCCH resources corresponding to the second resource index through a second antenna (port) (S3330). Steps S3320 and S3330 are performed on the same subframe.

The PUCCH signal may include hybrid automatic repeat request acknowledgement (HARQ-ACK). HARQ-ACK includes a response (e.g., ACK, NACK, DTX or NACK/DTX) to a downlink signal. If the PUCCH includes HARQ-ACK, although not shown, the procedure of FIG. 33 further includes a step of receiving a downlink signal. The step of receiving the downlink signal includes receiving a PDCCH for downlink scheduling and a PDSCH corresponding to the PDCCH. For PUCCH format 3 transmission, at least one of the PDCCH and the PDSCH may be received on an SCell.

As described with reference to FIGS. 32 to 33, multi-antenna (port) transmission (e.g., SORTD) requires orthogonal resources greater in amount than the amount of resources in single antenna (port) transmission. For example, 2Tx SORTD transmission requires orthogonal resources, the amount of which is twice the amount of resources in single antenna (port) transmission. Accordingly, the antenna (port) transmission mode is associated with the number of UEs multiplexed in a resource region for the PUCCH, that is, multiplexing capacity. Accordingly, the BS needs to flexibly configure the antenna (port) transmission mode according to the number of UEs communicating with the BS. For example, if the number of UEs accepted by the BS is small, multi-antenna (port) transmission mode (e.g., SORTD mode) using multiple resources may be configured with respect to each UE and, if the number of UEs accepted by the BS is large, a single antenna (port) transmission mode using a single resource may be configured. The antenna (port) transmission mode for PUCCH transmission may be configured by RRC signaling. In addition, the antenna (port) transmission mode may be independently configured on a per PUCCH format basis.

Hereinafter, the present invention proposes various methods of allocating resources (see step S3310 of FIG. 33) in an environment using multiple resources for multi-antenna (port) transmission in PUCCH format 3. For example, if 2Tx SORTD is applied to PUCCH format 3, since two orthogonal resources are necessary, there is a need for an allocation rule of two orthogonal resources.

First, single antenna (port) transmission requiring one orthogonal resource will be described. Resource allocation for PUCCH format 3 is based on explicit resource allocation. More specifically, a UE may be explicitly allocated PUCCH resource value candidates for PUCCH format 3 (or PUCCH resource value candidate set) (e.g., $n_{PUCCH,x}^{(3)}$ (x=0, 1, . . . , N)) through higher-layer (e.g., RRC) signaling in advance. Thereafter, a BS may transmit an ACK/NACK (A/N) resource indicator (ARI) (HARQ-ACK resource value) to the UE and the UE may determine a PUCCH resource value $n_{PUCCH}^{(3)}$ used for actual PUCCH transmission through the ARI. The PUCCH resource value $n_{PUCCH}^{(3)}$ is mapped to PUCCH resources (e.g., OC or PRB). The ARI may be used to directly indicate which of the PUCCH resource value candidate(s) (or which PUCCH resource value candidate set) provided by the higher layer in advance will be used. In implementation, the ARI may indicate an offset value of the PUCCH resource value signaled (by the higher layer). A transmit power control (TPC) field of a PDSCH-scheduling PDCCH (SCell PDCCH) transmitted on an SCell may be reused as the ARI. The TPC field of the PDSCH-scheduling PDCCH (PCell PDCCH) transmitted on a PCell may be used for PUCCH power control which is an original purpose thereof. In case of 3GPP Rel-10, since the PDSCH of the PCell does not allow cross-carrier scheduling from the SCell, receiving the PDSCH only on the PCell may be equal to receiving the PDCCH only on the PCell.

More specifically, if PUCCH resource(s) for A/N are allocated by RRC in advance, resources used for actual PUCCH transmission may be determined as follows:

The PDCCH corresponding to the PDSCH on the SCell(s) (or the PDCCH on the SCell(s) corresponding to the PDSCH) indicates one of the PUCCH resource(s) configured by RRC using the ARI (HARQ-ACK resource value).

If the PDCCH corresponding to the PDSCH on the SCell(s) (or the PDCCH on the SCell(s) corresponding to the PDSCH) is not detected and the PDSCH is received on the PCell, any one of the following methods is applicable:

Implicit A/N PUCCH resource according to the existing 3GPP Rel-8 (that is, PUCCH format 1a/1b resource obtained using a lowest CCE configuring the PDCCH) is used.

The PDCCH corresponding to the PDSCH on the PCell(s) (or the PDCCH on the PCell(s) corresponding to the PDSCH) indicates one of the PUCCH resource(s) configured by RRC using the ARI (HARQ-ACK resource value).

It is assumed that all the PDCCHs corresponding to the PDSCHs on the SCells (or the PDCCHs on the SCells corresponding to the PDSCHs) have the same ARI (HARQ-ACK resource value).

The ARI (HARQ-ACK resource value) may have X bits and X may be 2 if the TPC field of the SCell PDCCH is reused. For convenience, it is assumed that X=2.

Hereinafter, a resource allocation method for supporting various antenna (port) transmission modes if control information is transmitted using PUCCH format 3 will be described.

For example, the UE may be allocated four orthogonal resources for PUCCH format 3, for example, PUCCH resource values $n_{PUCCH,0}^{(3)}$, $n_{PUCCH,1}^{(3)}$, $n_{PUCCH,2}^{(3)}$ and $n_{PUCCH,3}^{(3)}$ through RRC signaling (e.g., four RRC signals). In addition, the UE may be allocated one set $\{n_{PUCCH,0}^{(3)}, n_{PUCCH,1}^{(3)}, n_{PUCCH,2}^{(3)}, n_{PUCCH,3}^{(3)}\}$ composed of four PUCCH resource values as one RRC signal. Thereafter, the UE may detect a PDCCH signal and receive a PDSCH signal corresponding thereto. At least one of the PDCCH signal and the PDSCH signal may be received through an SCell. Thereafter, the UE may determine the PUCCH resource value $n_{PUCCH}^{(3)}$ used for actual PUCCH transmission according to the bit value of the ARI (HARQ-ACK resource value) in the PDCCH signal. The determined PUCCH resource value is mapped to PUCCH resources (e.g., OC or PRB). A UCI (e.g., HARQ-ACK for PDSCH) is transmitted over a network (e.g., a BS or a relay node (RN)) using the PUCCH resources to which the PUCCH resource value is mapped. The above-described methods are shown in Table 16.

TABLE 16

| HARQ-ACK resource value for PUCCH (ARI) | $n_{PUCCH}^{(3)}$ |
|---|---|
| 00 | First PUCCH resource value $n_{PUCCH,0}^{(3)}$ configured by higher layers |
| 01 | Second PUCCH resource value $n_{PUCCH,1}^{(3)}$ configured by higher layers |
| 10 | Third PUCCH resource value $n_{PUCCH,2}^{(3)}$ configured by higher layers |
| 11 | Fourth PUCCH resource value $n_{PUCCH,3}^{(3)}$ configured by higher layers | where, HARQ-ACK indicates a HARQ ACK/NACK/DTX response to a downlink transport block. The HARQ ACK/NACK/DTX response includes ACK, NACK, DTX and NACK/DTX.

If it is assumed that the ARI (HARQ-ACK resource value) is transmitted using the TPC field of the SCell PDCCH, if the UE receives the PDSCH only on the PCell (receives the PDCCH only on the PCell), the ARI or the PUCCH resource value associated with the ARI is not recognized. Accordingly, if an event occurs, fall-back using the existing 3GPP Rel-8/9 PUCCH resources and Rel-8/9 PUCCH format 1a/1b is applicable.

Next, a method of allocating a plurality of orthogonal resources for transmit diversity (e.g., SORTD) will be described. For convenience, it is assumed that two orthogonal resources are used.

In the following description, a resource (set) additionally necessary for multi-antenna port transmission may be allocated in consideration of UE capability or an actual transmission mode of the UE. For example, if the UE supports multi-antenna port transmission, the BS may allocate the second resource (set) for multi-antenna port transmission along with the first resource (set) for single antenna port transmission in advance. Thereafter, the UE may use the first resource (set) in the single antenna port transmission mode and use the first resource (set) and the second resource (set) in the multi-antenna port transmission mode. In addition, the BS may allocate the second resource (set) for multi-antenna port transmission in consideration of the current transmission mode of the UE. For example, the BS may allocate the second resource (set) for the UE after instructing the UE to operate in the multi-antenna port transmission mode. That is, the UE may be additionally allocated the first resource (set) only after the multi-antenna port transmission mode is configured in a state in which the first resource (set) is allocated.

For example, the UE may basically receive allocation information indicating a plurality of PUCCH resources for an antenna port p0 and may additionally receive allocation information indicating a plurality of PUCCH resources for an antenna port p1 only when multi-antenna port transmission is possible or the multi-antenna port transmission mode is configured.

In this case, the UE may be allocated eight orthogonal resources for PUCCH format 3, for example, PUCCH resource values $n_{PUCCH,0}^{(3)}$, $n_{PUCCH,1}^{(3)}$, $n_{PUCCH,2}^{(3)}$, $n_{PUCCH,3}^{(3)}$, $n_{PUCCH,4}^{(3)}$, $n_{PUCCH,5}^{(3)}$, $n_{PUCCH,6}^{(3)}$ and $n_{PUCCH,7}^{(3)}$ through RRC signals (e.g., eight RRC signals). In addition, the UE may be allocated one set $\{n_{PUCCH,0}^{(3)}, n_{PUCCH,1}^{(3)}, n_{PUCCH,2}^{(3)}, n_{PUCCH,3}^{(3)}, n_{PUCCH,4}^{(3)}, n_{PUCCH,5}^{(3)}, n_{PUCCH,6}^{(3)}, n_{PUCCH,7}^{(3)},\}$ composed of eight PUCCH resources values through one RRC signal. Thereafter, the UE may detect a PDCCH signal and a PDSCH corresponding thereto. At least one of the PDCCH signal and the PDSCH signal may be received through an SCell. Thereafter, the UE may determine the PUCCH resource value $n_{PUCCH}^{(3,p)}$ used for actual PUCCH transmission according to the bit value of the ARI (HARQ-ACK resource value) in the PDCCH signal. p denotes an antenna port number or a value associated therewith. The determined PUCCH resource value is mapped to PUCCH resources (e.g., OC or PRB). A UCI (e.g., HARQ-ACK for PDSCH) is transmitted over a network (e.g., a BS or a relay node (RN)) using the PUCCH resources to which the PUCCH resource value is mapped.

In the multi-antenna port transmission mode, one ARI is used to indicate a plurality of PUCCH resource values. The plurality of PUCCH resource values indicated by the ARI is mapped to PUCCH resources for the respective antenna ports. Accordingly, the ARI may indicate one or a plurality of PUCCH resource values depending on whether the antenna port transmission mode is a single antenna port mode or a multi-antenna port mode. The above-described method is shown in Table 17.

TABLE 17

| HARQ-ACK resource value (ARI) for PUCCH | $n_{PUCCH}^{(3,p)}$ | |
|---|---|---|
| | p = p0 (e.g., antenna port 0) | p = p1 (e.g., antenna port 1) |
| 00 | First PUCCH resource value $n_{PUCCH,0}^{(3)}$ configured by higher layers | Fifth PUCCH resource value $n_{PUCCH,4}^{(3)}$ configured by higher layers |
| 01 | Second PUCCH resource value $n_{PUCCH,1}^{(3)}$ configured by higher layers | Sixth PUCCH resource value $n_{PUCCH,5}^{(3)}$ configured by higher layers |
| 10 | Third PUCCH resource value $n_{PUCCH,2}^{(3)}$ configured by higher layers | Seventh PUCCH resource value $n_{PUCCH,6}^{(3)}$ configured by higher layers |
| 11 | Fourth PUCCH resource value $n_{PUCCH,3}^{(3)}$ configured by higher layers | Eighth PUCCH resource value $n_{PUCCH,7}^{(3)}$ configured by higher layers |

As another example, the UE may be allocated four orthogonal resources (e.g., PUCCH resource values) through RRC signaling on a per antenna port basis as follows. Thereafter, the UE may detect a PDCCH signal and receive a PDSCH signal corresponding thereto. At least one of the PDCCH signal and the PDSCH signal may be received through an SCell. Thereafter, the UE may determine a final PUCCH resource value $n_{PUCCH}^{(3,p)}$ to be used on a per antenna port basis according to the bit value of the ARI (HARQ-ACK resource value) in the PDCCH signal. The determined PUCCH resource value is mapped to PUCCH resources (e.g., OC or PRB) for each antenna port. p indicates an antenna port number or a value associated therewith. This method is shown in Table 18.

$n_{PUCCH,0}^{(3,0)}, n_{PUCCH,1}^{(3,0)}, n_{PUCCH,2}^{(3,0)}, n_{PUCCH,3}^{(3,0)}$ ->used for antenna port p0 (e.g., p0=0)

$n_{PUCCH,0}^{(3,1)}, n_{PUCCH,1}^{(3,1)}, n_{PUCCH,2}^{(3,1)}, n_{PUCCH,3}^{(3,1)}$ ->used for antenna port p1 (e.g., p1=1)

Although not limited, as described above, the UE may basically receive allocation information indicating a plurality of PUCCH resources for an antenna port p0 and may additionally receive allocation information indicating a plurality of PUCCH resources for an antenna port p1 only when multi-antenna port transmission is possible or the multi-antenna port transmission mode is configured.

TABLE 18

| HARQ-ACK resource value (ARI) for PUCCH | $n_{PUCCH}^{(3,p)}$ | |
|---|---|---|
| | p = p0 (e.g., antenna port 0) | p = p1 (e.g., antenna port 1) |
| 00 | First PUCCH resource value $n_{PUCCH,0}^{(3,0)}$ configured by higher layers | First PUCCH resource value $n_{PUCCH,0}^{(3,1)}$ configured by higher layers |
| 01 | Second PUCCH resource value $n_{PUCCH,1}^{(3,0)}$ configured by higher layers | Second PUCCH resource value $n_{PUCCH,1}^{(3,1)}$ configured by higher layers |
| 10 | Third PUCCH resource value $n_{PUCCH,2}^{(3,0)}$ configured by higher layers | Third PUCCH resource value $n_{PUCCH,2}^{(3,1)}$ configured by higher layers |
| 11 | Fourth PUCCH resource value $n_{PUCCH,3}^{(3,0)}$ configured by higher layers | Fourth PUCCH resource value $n_{PUCCH,3}^{(3,3)}$ configured by higher layers |

The UE may be basically allocated four orthogonal resources for single antenna port transmission, for example, PUCCH resource values $\{n_{PUCCH,0}^{(3,0)}, n_{PUCCH,1}^{(3,0)}, n_{PUCCH,2}^{(3,0)}, n_{PUCCH,3}^{(3,0)}\}$ through one RRC signal and may be allocated eight orthogonal resources for two antenna ports, for example, PUCCH resource values $\{n_{PUCCH,0}^{(3,0)}, n_{PUCCH,1}^{(3,0)}, n_{PUCCH,2}^{(3,0)}, n_{PUCCH,3}^{(3,0)}, n_{PUCCH,0}^{(3,1)}, n_{PUCCH,1}^{(3,1)}, n_{PUCCH,2}^{(3,1)}, n_{PUCCH,3}^{(3,1)}\}$ through one RRC signal if multi-antenna port transmission is possible or the multi-antenna port transmission mode is configured. The UE may determine the final PUCCH resource value $n_{PUCCH}^{(3,p)}$ to be used on a per antenna port basis and the PUCCH resource corresponding thereto according to the bit value of the ARI. The above-described method is shown in Table 19.

TABLE 19

| HARQ-ACK resource value (ARI) for PUCCH | $n_{PUCCH}^{(3,p)}$ | |
|---|---|---|
| | p = p0 (e.g., antenna port 0) | p = p1 (e.g., antenna port 1) |
| 00 | First PUCCH resource value $n_{PUCCH,0}^{(3,0)}$ configured by higher layers | Fifth PUCCH resource value $n_{PUCCH,0}^{(3,1)}$ configured by higher layers |
| 01 | Second PUCCH resource value $n_{PUCCH,1}^{(3,0)}$ configured by higher layers | Sixth PUCCH resource value $n_{PUCCH,1}^{(3,1)}$ configured by higher layers |
| 10 | Third PUCCH resource value $n_{PUCCH,2}^{(3,0)}$ configured by higher layers | Seventh PUCCH resource value $n_{PUCCH,2}^{(3,1)}$ configured by higher layers |
| 11 | Fourth PUCCH resource value $n_{PUCCH,3}^{(3,0)}$ configured by higher layers | Eighth PUCCH resource value $n_{PUCCH,3}^{(3,3)}$ configured by higher layers |

TABLE 20

| HARQ-ACK resource value (ARI) for PUCCH | $n_{PUCCH}^{(3,p)}$ |
|---|---|
| 00 | First PUCCH resource value configured by higher layers |
| 01 | Second PUCCH resource value configured by higher layers |
| 10 | Third PUCCH resource value configured by higher layers |
| 11 | Fourth PUCCH resource value configured by higher layers |

Tables 17 to 19 show the case where a part p=p0 of allocation of the PUCCH resource values for multiple antenna ports is configured to be equal to that in a single antenna port. That is, a nested structure is assumed in Tables 17 to 19. Accordingly, one common table may support both single antenna port transmission and multi-antenna port transmission.

Referring to Table 18, the nested structure will be described in greater detail. In the nested structure, one common table may be used. Table 20 shows a common table for the single antenna port transmission mode and the multi-antenna port transmission mode.

If the UE is configured to the single antenna port transmission mode in association with PUCCH transmission, Table 20 may be analyzed as Table 21. Accordingly, if the UE is configured to the single antenna port transmission mode, the PUCCH resource value $n_{PUCCH}^{(3,p)}$ indicated by the ARI is finally mapped to one PUCCH resource $n_{PUCCH}^{(3,p0)}$ for a single antenna port (e.g., p0).

TABLE 21

| 2 | $n_{PUCCH}^{(3,p)}$ | | $n_{PUCCH}^{(3,p)}$ (p = p0) |
|---|---|---|---|
| 00 | First PUCCH resource value configured by higher layers | → | $n_{PUCCH,0}^{(3,p0)}$ |

TABLE 21-continued

| | 2 | $n_{PUCCH}^{(3,p)}$ | $n_{PUCCH}^{(3,p)}$ (p = p0) |
|---|---|---|---|
| 01 | | Second PUCCH resource value configured by higher layers | $n_{PUCCH,1}^{(3,p0)}$ |
| 10 | | Third PUCCH resource value configured by higher layers | $n_{PUCCH,2}^{(3,p0)}$ |
| 11 | | Fourth PUCCH resource value configured by higher layers | $n_{PUCCH,3}^{(3,p0)}$ |

If the UE is configured to the multi-antenna port transmission mode in association with PUCCH transmission, Table 20 may be analyzed as Table 22. Accordingly, if the UE is configured to the multi-antenna port transmission mode, the PUCCH resource value $n_{PUCCH}^{(3,p)}$ indicated by the ARI is finally mapped to a plurality of PUCCH resources $n_{PUCCH}^{(3,p0)}$ and $n_{PUCCH}^{(3,p1)}$ for multiple antenna ports (e.g., p0 and p1).

TABLE 22

| HARQ-ACK resource value (ARI) for PUCCH | $n_{PUCCH}^{(3,p)}$ | $n_{PUCCH}^{(3,p)}$ (p = p0) | $n_{PUCCH}^{(3,p)}$ (p = p1) |
|---|---|---|---|
| 00 | First PUCCH resource value configured by higher layers | → $n_{PUCCH,0}^{(3,p0)}$ | $n_{PUCCH,0}^{(3,p1)}$ |
| 01 | Second PUCCH resource value configured by higher layers | $n_{PUCCH,1}^{(3,p0)}$ | $n_{PUCCH,1}^{(3,p1)}$ |
| 10 | Third PUCCH resource value configured by higher layers | $n_{PUCCH,2}^{(3,p0)}$ | $n_{PUCCH,2}^{(3,p1)}$ |
| 11 | Fourth PUCCH resource value configured by higher layers | $n_{PUCCH,3}^{(3,p0)}$ | $n_{PUCCH,3}^{(3,p1)}$ |

As another example of allocating a plurality (e.g., two) of orthogonal resources for transmit diversity, that is, SORTD, will be described. For example, it is assumed that the UE is allocated four orthogonal resources for PUCCH format 3, for example, PUCCH resource values $n_{PUCCH,0}^{(3)}$, $n_{PUCCH,1}^{(3)}$, $n_{PUCCH,2}^{(3)}$ and $n_{PUCCH,3}^{(3)}$ through RRC signals (e.g., four RRC signals). Alternatively, it may be assumed that the UE is allocated one set $\{n_{PUCCH,0}^{(3)}, n_{PUCCH,1}^{(3)}, n_{PUCCH,2}^{(3)}, n_{PUCCH,3}^{(3)}\}$ composed of four PUCCH resource values through one RRC signal. As described above, the UE may determine a final PUCCH resource $n_{PUCCH}^{(3,p)}$ to be used on a per antenna port basis according to the bit value of the ARI. On the above assumption, according to this example, four PUCCH resource values may be divided into two groups of group0=$\{n_{PUCCH,0}^{(3)}, n_{PUCCH,1}^{(3)}\}$ and group1=$\{n_{PUCCH,2}^{(3)}, n_{PUCCH,3}^{(3)}\}$. In this case, one bit of the front part and one bit of the back part of the ARI may be used to indicate resources for respective groups. For example, it is assumed that the ARI is composed of b0 and b1 (each of b0 and b1 is 0 or 1). In this case, b0 indicates which of the PUCCH resource values is used in the group 0 and b1 indicates which of the PUCCH resource values is used in the group 1. The PUCCH resource value selected from the group 0 may be mapped to the PUCCH resources (e.g., OC or PRB) for the antenna port p0 and the resource selected from group 1 may be mapped to the PUCCH resources (e.g., OC or PRB) for the antenna port p1.

The above-described method is shown in Table 23. Although this method is applicable to the case where four PUCCH resource values $n_{PUCCH,0}^{(3)}$, $n_{PUCCH,1}^{(3)}$, $n_{PUCCH,2}^{(3)}$ and $n_{PUCCH,3}^{(3)}$ are allocated by RRC signaling, this method is applicable to the case where more orthogonal resources are used.

TABLE 23

| HARQ-ACK resource value (ARI) for PUCCH | $n_{PUCCH}^{(3,p)}$ | |
|---|---|---|
| | p = p0 (e.g., antenna port 0) | p = p1 (e.g., antenna port 1) |
| 00 | First PUCCH resource value $n_{PUCCH,0}^{(3)}$ for AP0 configured by higher layers | Third PUCCH resource value $n_{PUCCH,2}^{(3)}$ for AP1 configured by higher layers |
| 01 | First PUCCH resource value $n_{PUCCH,0}^{(3)}$ for AP0 configured by higher layers | Fourth PUCCH resource value $n_{PUCCH,3}^{(3)}$ for AP1 configured by higher layers |
| 10 | Second PUCCH resource value $n_{PUCCH,1}^{(3)}$ for AP0 configured by higher layers | Third PUCCH resource value $n_{PUCCH,2}^{(3)}$ for AP1 configured by higher layers |
| 11 | Second PUCCH resource value $n_{PUCCH,1}^{(3)}$ for AP0 configured by higher layers | Fourth PUCCH resource value $n_{PUCCH,3}^{(3)}$ for AP1 configured by higher layers |

Table 23 shows the case where (in case of 2Tx, a total of four) signals are received through two RRC signals per respective antennas and each bit of the ARI indicates resources used for each antenna port. Table 24 shows the case where $\{n_{PUCCH,0}^{(3,0)}, n_{PUCCH,1}^{(3,0)}\}$ is allocated for the antenna port p0 and $\{n_{PUCCH,0}^{(3,1)}, n_{PUCCH,1}^{(3,1)}\}$ is allocated for the antenna port p1.

TABLE 24

| HARQ-ACK resource value (ARI) for PUCCH | $n_{PUCCH}^{(3,p)}$ | |
|---|---|---|
| | p = p0 (e.g., antenna port 0) | p = p1 (e.g., antenna port 1) |
| 00 | First PUCCH resource value $n_{PUCCH,0}^{(3,0)}$ for the antenna port 0 (AP0) configured by higher layers | First PUCCH resource value $n_{PUCCH,0}^{(3,1)}$ for the antenna port 1 (AP1) configured by higher layers |
| 01 | First PUCCH resource value $n_{PUCCH,0}^{(3,0)}$ for AP0 configured by higher layers | Second PUCCH resource value $n_{PUCCH,1}^{(3,1)}$ for AP1 configured by higher layers |
| 10 | Second PUCCH resource value $n_{PUCCH,1}^{(3,0)}$ for AP0 configured by higher layers | First PUCCH resource value $n_{PUCCH,0}^{(3,1)}$ for AP1 configured by higher layers |
| 11 | Second PUCCH resource value $n_{PUCCH,1}^{(3,0)}$ for AP0 configured by higher layers | Second PUCCH resource value $n_{PUCCH,1}^{(3,1)}$ for AP1 configured by higher layers |

As another embodiment of the present invention, a method of a downlink assignment index in case of TDD CA will be described. The DAI is a value obtained by counting scheduled PDCCHs in a time domain and is extensible to a cell (or CC)

domain in CA. In case of PUCCH format 3, since a DAI value is not necessary, the DAI may be used in the present invention.

For example, PUCCH format 3 resources for a first antenna port (p=p0) may be allocated/determined using an ARI and PUCCH format resource for a second antenna port (p=p1) may be allocated/determined using a DAI. PDCCH(s) of a serving cell may be restricted to have the same DAI value in preparation for the case where the PDCCH of at least one serving cell fails. If a PDSCH is scheduled only on a PCell, a UE may ignore a DAI value of a PCell PDCCH corresponding to the PDSCH, fall back to a single antenna port mode, and transmit a PUCCH.

For convenience, it is assumed that the UE is allocated four orthogonal resources, for example, PUCCH resource values $n_{PUCCH,0}^{(3)}$, $n_{PUCCH,1}^{(3)}$, $n_{PUCCH,2}^{(3)}$ and $n_{PUCCH,3}^{(3)}$ through RRC signaling in advance. Thereafter, if it is assumed that the UE receives a PDCCH signal including ARI=[00] and DAI=[10], $n_{PUCCH,0}^{(3,0)} = n_{PUCCH,0}^{(3)}$ ->used for antenna port p0 (e.g., p0=0)

$n_{PUCCH,0}^{(3,1)} = n_{PUCCH,2}^{(3)}$ ->used for antenna port p1 (e.g., p1=1)

The above-described method is shown in Table 25.

TABLE 25

| HARQ-ACK resource value (ARI) for PUCCH (used for p = p0) | DAI value (used for p = p1) | $n_{PUCCH}^{(3,p)}$ | |
|---|---|---|---|
| | | p = p0 (e.g., antenna port 0) | p = p1 (e.g., antenna port 1) |
| 00 | 01 | First PUCCH resource value $n_{PUCCH,0}^{(3)}$ configured by higher layers | Second PUCCH resource value $n_{PUCCH,1}^{(3)}$ configured by higher layers |
| 00 | 10 | First PUCCH resource value $n_{PUCCH,0}^{(3)}$ configured by higher layers | Third PUCCH resource value $n_{PUCCH,2}^{(3)}$ configured by higher layers |
| 00 | 11 | First PUCCH value $n_{PUCCH,0}^{(3)}$ configured by higher layers | Fourth PUCCH resource value $n_{PUCCH,3}^{(3)}$ configured by higher layers |
| 01 | 10 | Second PUCCH resource value $n_{PUCCH,1}^{(3)}$ configured by higher layers | Third PUCCH resource value $n_{PUCCH,2}^{(3)}$ configured by higher layers |
| 01 | 11 | Second PUCCH resource value $n_{PUCCH,1}^{(3)}$ configured by higher layers | Fourth PUCCH resource value $n_{PUCCH,3}^{(3)}$ configured by higher layers |
| 10 | 11 | Third PUCCH resource value $n_{PUCCH,2}^{(3)}$ configured by higher layers | Fourth PUCCH resource value $n_{PUCCH,3}^{(3)}$ configured by higher layers |

In addition, the same method is applicable to the case where the UE is allocated eight orthogonal resources, for example, the PUCCH resource values $n_{PUCCH,0}^{(3)}$, $n_{PUCCH,1}^{(3)}$, $n_{PUCCH,2}^{(3)}$, $n_{PUCCH,3}^{(3)}$, $n_{PUCCH,4}^{(3)}$, $n_{PUCCH,5}^{(3)}$, $n_{PUCCH,6}^{(3)}$, $n_{PUCCH,7}^{(3)}$, through RRC signaling in advance. For example, the ARI values 00, 01, 10 and 11 for the antenna port 0 respectively indicate $n_{PUCCH,0}^{(3)}$, $n_{PUCCH,1}^{(3)}$, $n_{PUCCH,2}^{(3)}$ and $n_{PUCCH,3}^{(3)}$ and the DAI values 00, 01, 10 and 11 for the antenna port 1 respectively indicate $n_{PUCCH,4}^{(3)}$, $n_{PUCCH,5}^{(3)}$, $n_{PUCCH,6}^{(3)}$ and $n_{PUCCH,7}^{(3)}$.

As another example, the UE may be allocated four orthogonal resources through RRC signaling on a per antenna port basis as follows.

$n_{PUCCH,0}^{(3,0)}$, $n_{PUCCH,1}^{(3,0)}$, $n_{PUCCH,2}^{(3,0)}$, $n_{PUCCH,3}^{(3,0)}$ ->used for the antenna port p0 (e.g., p0=0)

$n_{PUCCH,0}^{(3,1)}$, $n_{PUCCH,1}^{(3,1)}$, $n_{PUCCH,2}^{(3,1)}$, $n_{PUCCH,3}^{(3,1)}$ ->used for the antenna port p1 (e.g., p1=1)

At this time, the ARI values 00, 01, 10 and 11 respectively indicate $n_{PUCCH,0}^{(3,0)}$, $n_{PUCCH,1}^{(3,0)}$, $n_{PUCCH,2}^{(3,0)}$ and $n_{PUCCH,3}^{(3,0)}$ and the DAI values 00, 01, 10 and 11 respectively indicate $n_{PUCCH,0}^{(3,1)}$, $n_{PUCCH,1}^{(3,1)}$, $n_{PUCCH,2}^{(3,1)}$, $n_{PUCCH,3}^{(3,1)}$.

Figure 34:
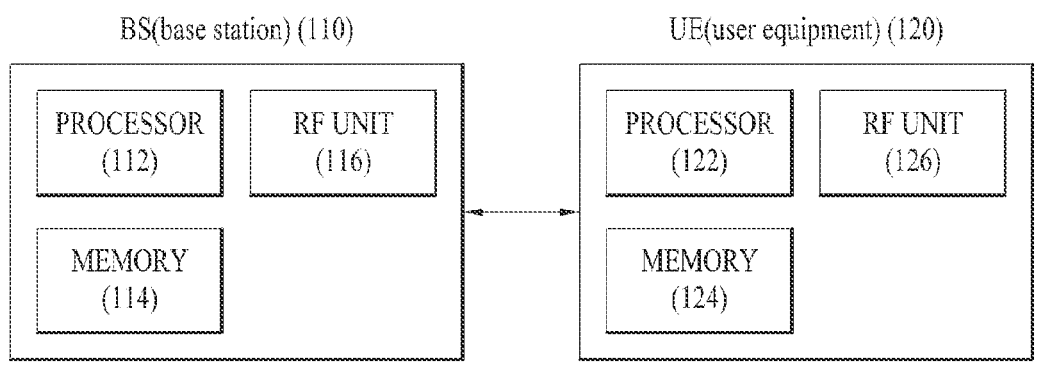
FIG. 34 is a diagram showing a BS and a UE applicable to the present invention.

FIG. 34 is a diagram showing a BS and a UE applicable to the present invention.

Referring to FIG. 34, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 so as to store a variety of information associated with the operation of the processor 112. The RF unit 116 is connected to the processor 112 so as to transmit and/or receive a RF signal. The UE 120 includes a processor 122, a memory 124 and a RF unit 126. The processor 122 may be configured to implement the procedures and/or methods proposed by the present invention. The memory 124 is connected to the processor 122 so as to store a variety of information associated with the operation of the processor 122. The RF unit 126 is connected to the processor 122 so as to transmit and/or receive a RF signal. The BS 110 and/or the UE 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Industrial Applicability

The present invention is applicable to a terminal, a BS or another device of a wireless mobile communication system. More specifically, the present invention is applicable to a method and apparatus for transmitting uplink control information.

What is claimed is:

1. A method for transmitting control information using Physical Uplink Control Channel PUCCH) format 3 by a communication apparatus in a radio communication system, comprising:
   detecting a Physical Downlink Control Channel (PDCCH) signal;
   receiving a Physical Downlink Shared Channel (PDSCH) signal corresponding to the PDCCH signal on a secondary cell (SCell); and
   determining one or more PUCCH resources among a plurality of PUCCH resources configured by a higher layer for the PUCCH format 3, wherein the one or more PUCCH resources are indicated by a value of a transmit power control (TPC) field of the PDCCH signal,
   wherein, if a single antenna port transmission mode is configured, the value of the TPC field is mapped to a PUCCH resource $n_{PUCCH}^{(3,p0)}$ for an antenna port p0, and
   wherein, if a multi-antenna port transmission mode is configured, the value of the TPC field is mapped to the PUCCH resource $n_{PUCCH}^{(3,p0)}$ for the antenna port p0 and a PUCCH resource $n_{PUCCH}^{(3,p0)}$ for an antenna port p1.

2. The method according to claim 1, further comprising transmitting the control information using the one or more determined PUCCH resources, wherein the control information includes Hybrid Automatic Repeat reQuest Acknowledgement (HARQ-ACK) for the PDSCH signal.

3. The method according to claim 1, further comprising receiving allocation information indicating a plurality of PUCCH resources for the antenna port p0,
   wherein allocation information indicating a plurality of PUCCH resources for the antenna port p1 is additionally received only when multi-antenna port transmission is possible or when the multi-antenna port transmission mode is configured.

4. A communication apparatus configured to transmit control information using a Physical Uplink Control Channel (PUCCH) format 3 in a radio communication system, comprising:
   a radio frequency (RF) unit; and
   a processor configured to detect a Physical Downlink Control Channel (PDCCH), receive a Physical Downlink Shared Channel (PDSCH) signal corresponding to the PDCCH signal on a secondary cell (SCell), and determine one or more PUCCH resources among a plurality of PUCCH resources configured by a higher layer for the PUCCH format 3, wherein the one or more PUCCH resources are indicated by a value of a transmit power control (TPC) field of the PDCCH signal,
   wherein, if a single antenna port transmission mode is configured, the value of the TPC field is mapped to the PUCCH resource $n_{PUCCH}^{(3,p0)}$ for an antenna port p0, and
   wherein, if a multi-antenna port transmission mode is configured, the value of the TPC field is mapped to the PUCCH resource $n_{PUCCH}^{(3,p0)}$ for the antenna port p0 and a PUCCH resource $n_{PUCCH}^{(3,p0)}$ for an antenna port p1.

5. The communication apparatus according to claim 4, wherein the processor is further configured to transmit the control information using the one or more determined PUCCH resources, and the control information includes Hybrid Automatic Repeat reQuest Acknowledgement (HARQ-ACK) for the PDSCH signal.

6. The communication apparatus according to claim 4, wherein the processor is configured to receive allocation information indicating a plurality of PUCCH resources for the antenna port p0,
   wherein allocation information indicating a plurality of PUCCH resources for the antenna port p1 is additionally received only when multi-antenna port transmission is possible or when the multi-antenna port transmission mode is configured.

* * * * *

UNITED STATES PATENT AND TRADEMARK OFFICE
CERTIFICATE OF CORRECTION

PATENT NO. : 8,514,826 B2  
APPLICATION NO. : 13/287961  
DATED : August 20, 2013  
INVENTOR(S) : Seung Hee Han et al.

Page 1 of 1

It is certified that error appears in the above-identified patent and that said Letters Patent is hereby corrected as shown below:

In The Claims

Claim 1, Column 38, Line 8; delete "$n_{PUCCH}^{(3,p0)}$" and insert -- $n_{PUCCH}^{(3,p1)}$ --

Claim 4, Column 38, Line 44; delete "$n_{PUCCH}^{(3,p0)}$" and insert -- $n_{PUCCH}^{(3,p1)}$ --

Signed and Sealed this  
Twelfth Day of May, 2015

Michelle K. Lee  
*Director of the United States Patent and Trademark Office*